No. 898,411. PATENTED SEPT. 8, 1908.
A. HOCH.
ADDING MACHINE.
APPLICATION FILED SEPT. 18, 1907.

19 SHEETS—SHEET 1.

No. 898,411. PATENTED SEPT. 8, 1908.
A. HOCH.
ADDING MACHINE.
APPLICATION FILED SEPT. 18, 1907.

19 SHEETS—SHEET 4.

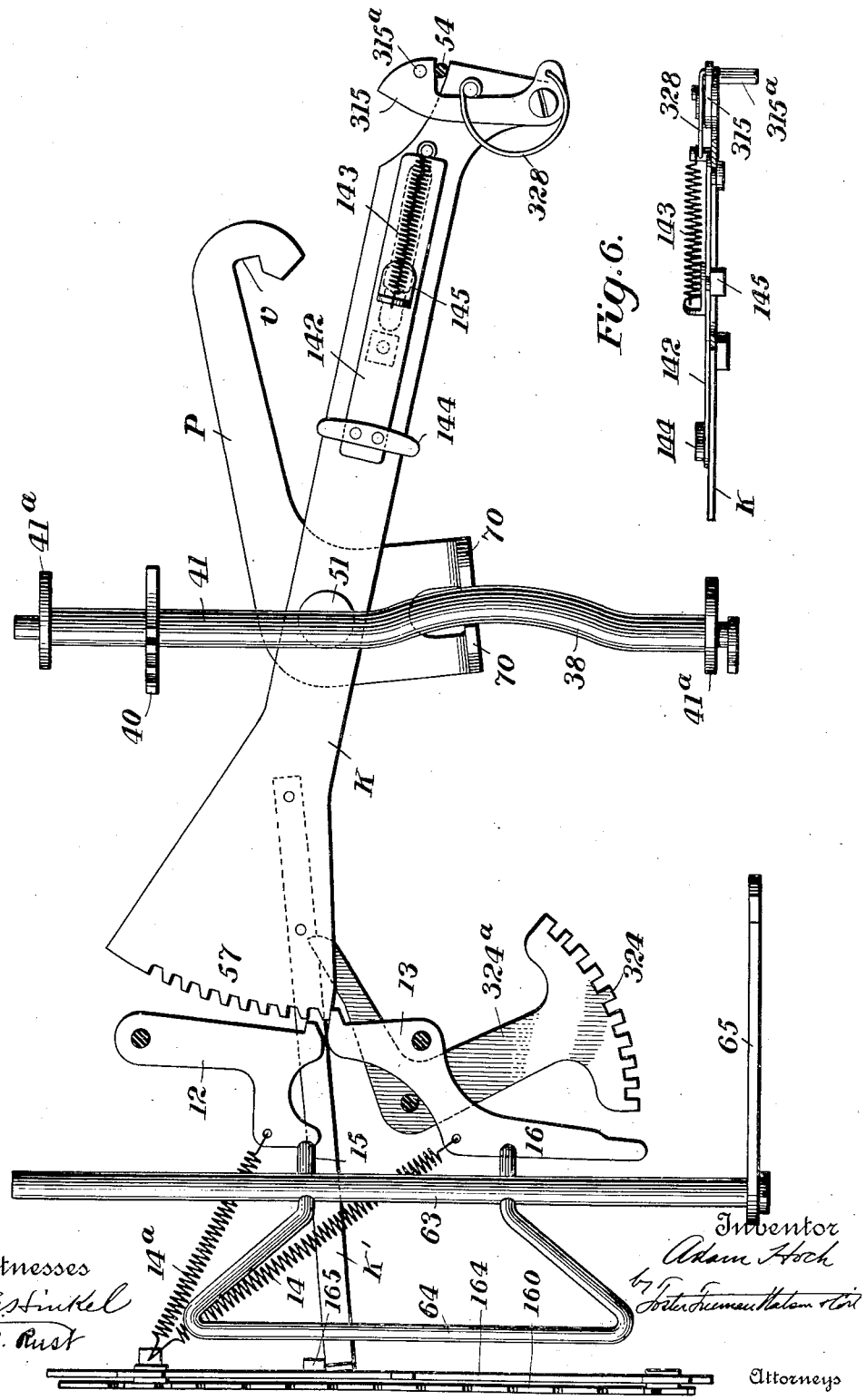

No. 898,411. PATENTED SEPT. 8, 1908.
A. HOCH.
ADDING MACHINE.
APPLICATION FILED SEPT. 18, 1907.
19 SHEETS—SHEET 6.
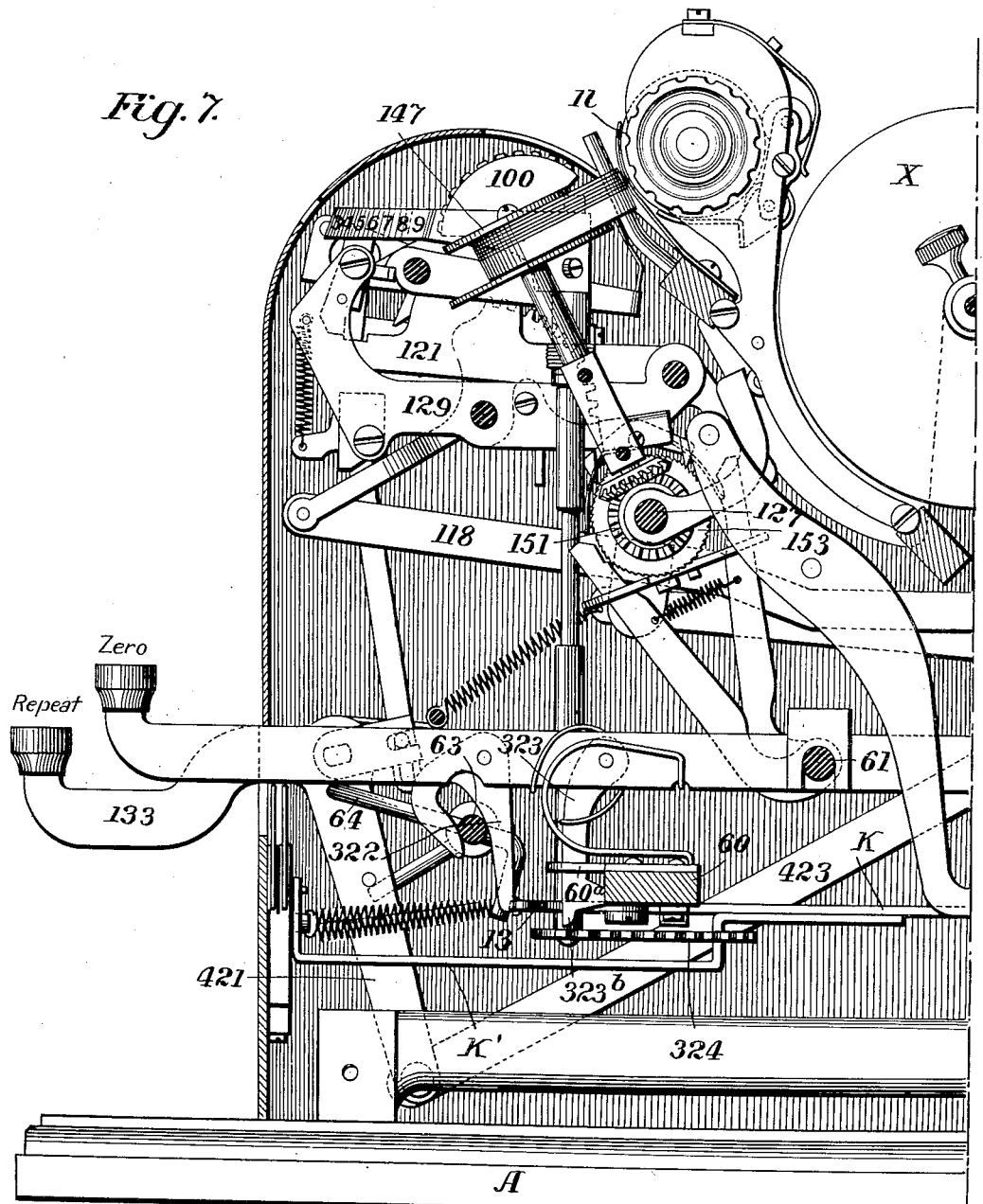

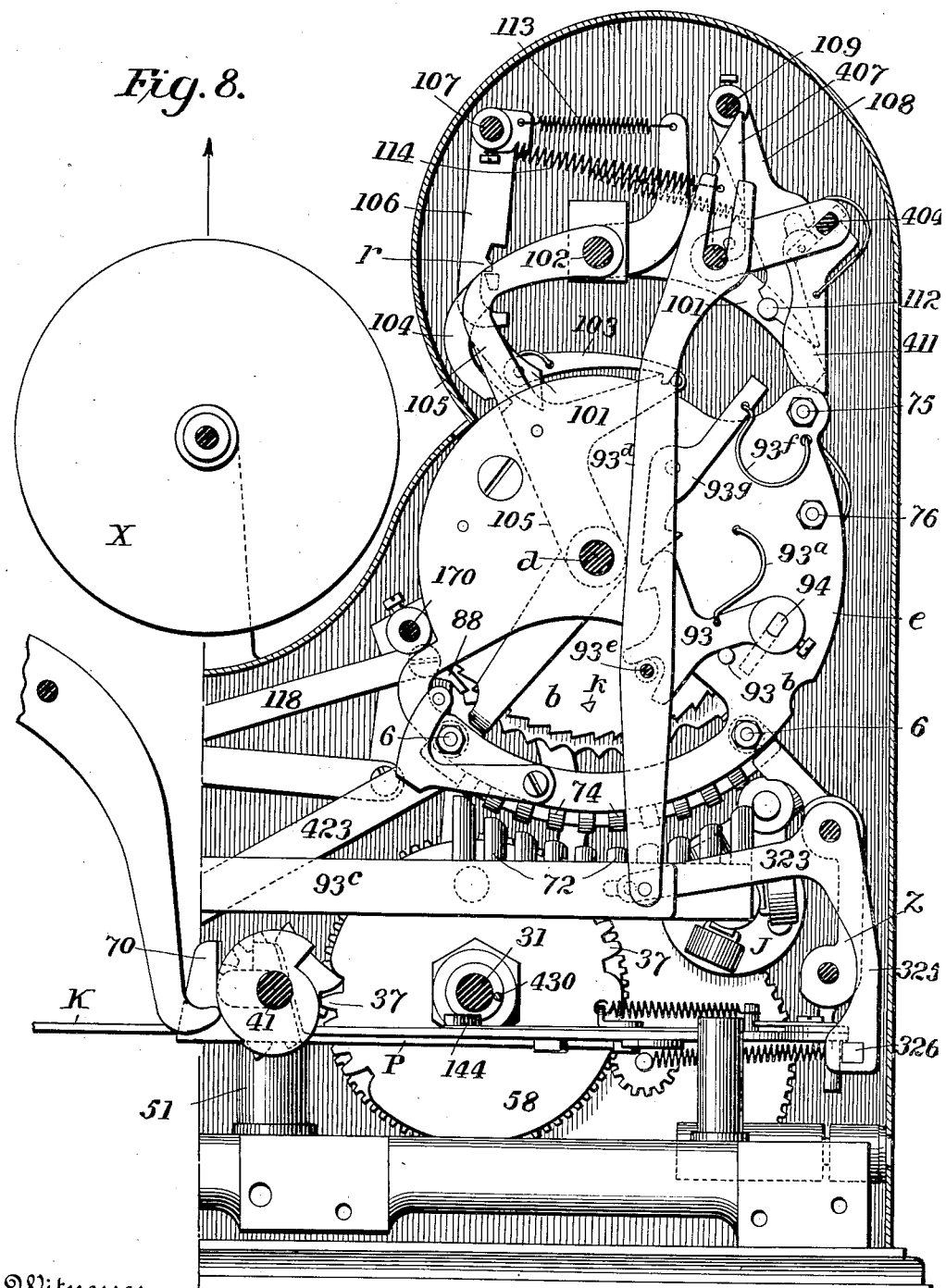

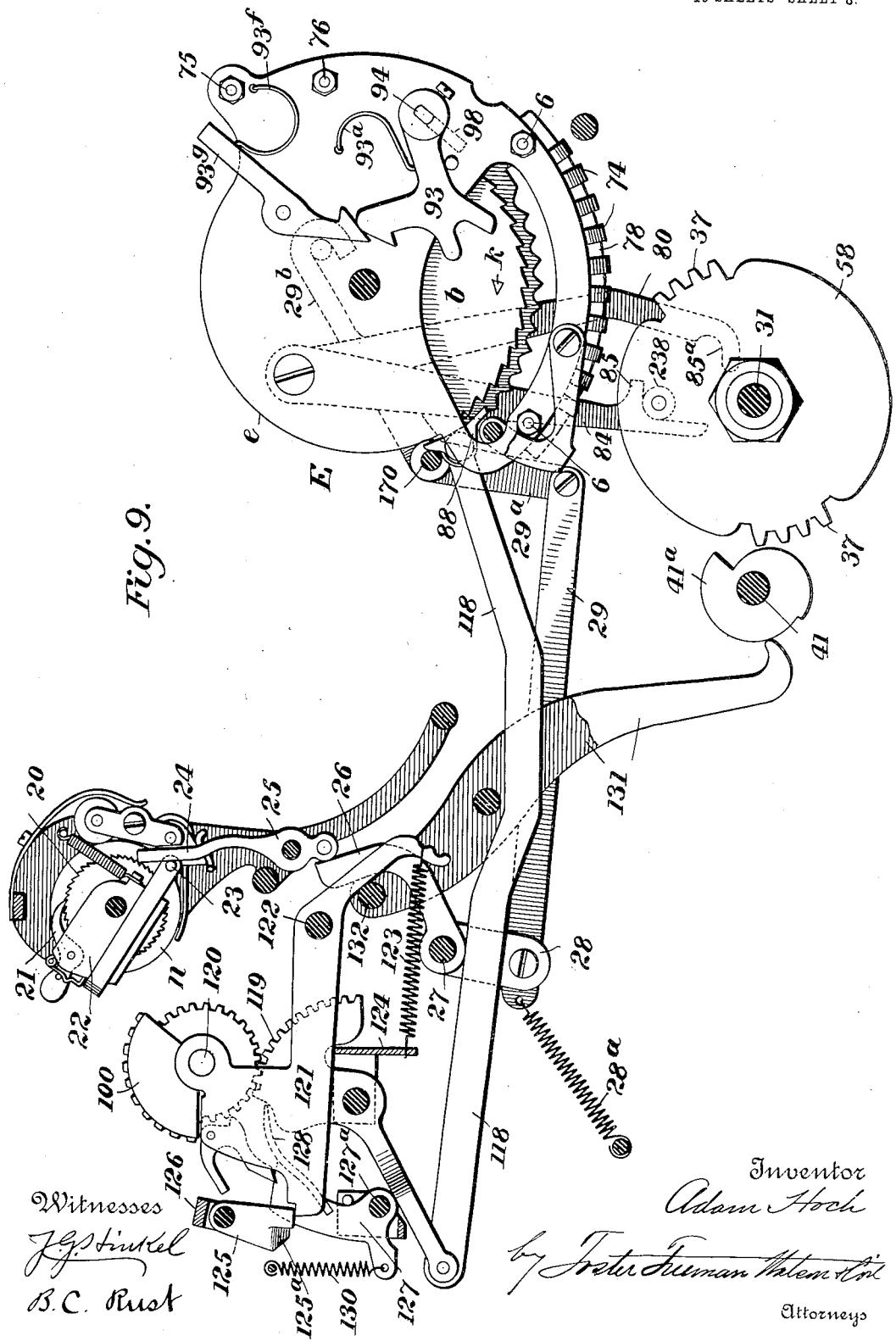

No. 898,411. PATENTED SEPT. 8, 1908.
A. HOCH.
ADDING MACHINE.
APPLICATION FILED SEPT. 18, 1907.
19 SHEETS—SHEET 9.
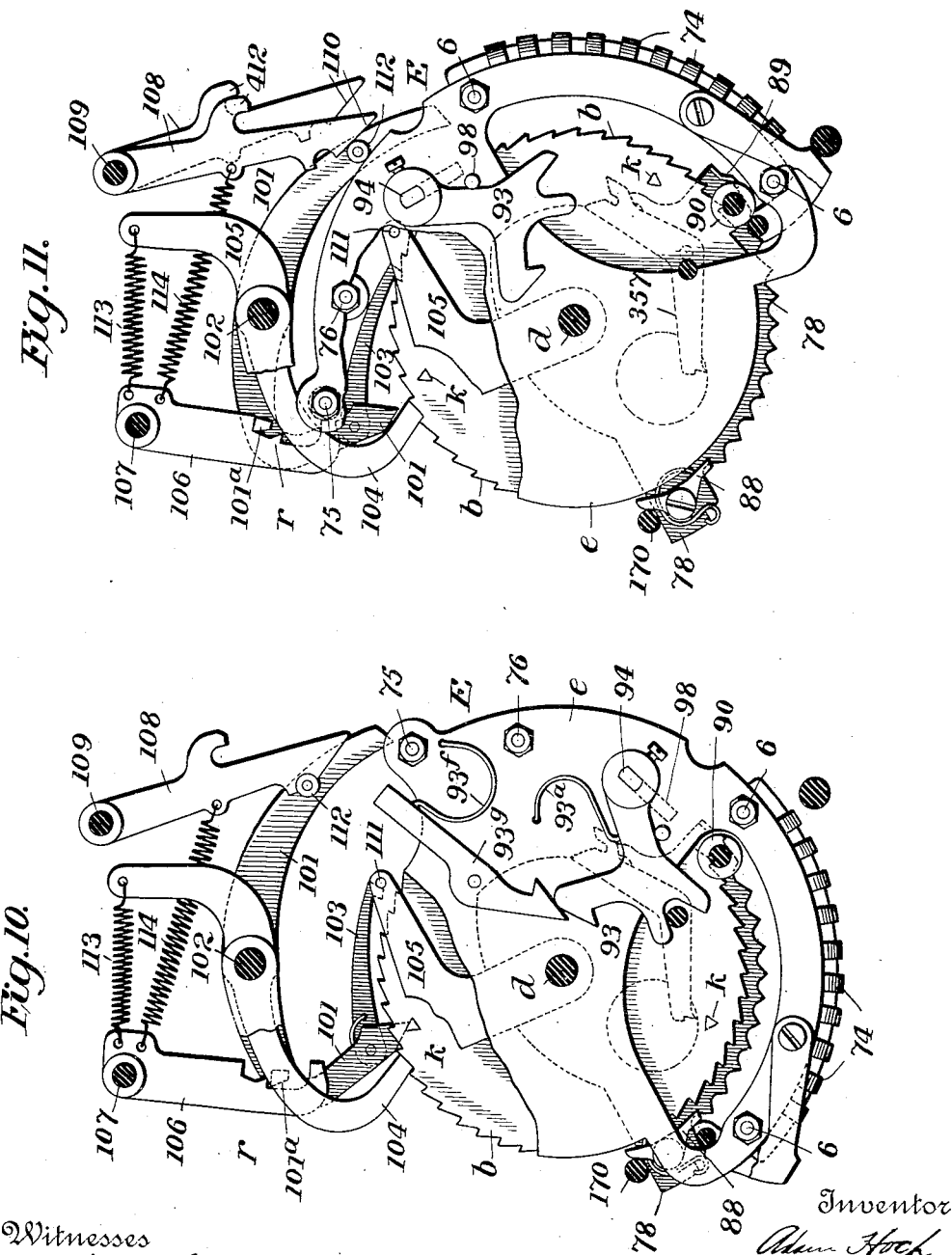

No. 898,411.

PATENTED SEPT. 8, 1908.

A. HOCH.
ADDING MACHINE.
APPLICATION FILED SEPT. 18, 1907.

19 SHEETS—SHEET 10.

Witnesses
J. G. Finkel
B. C. Rust

Inventor
Adam Hoch
by Foster Freeman Watson & Coe
Attorneys

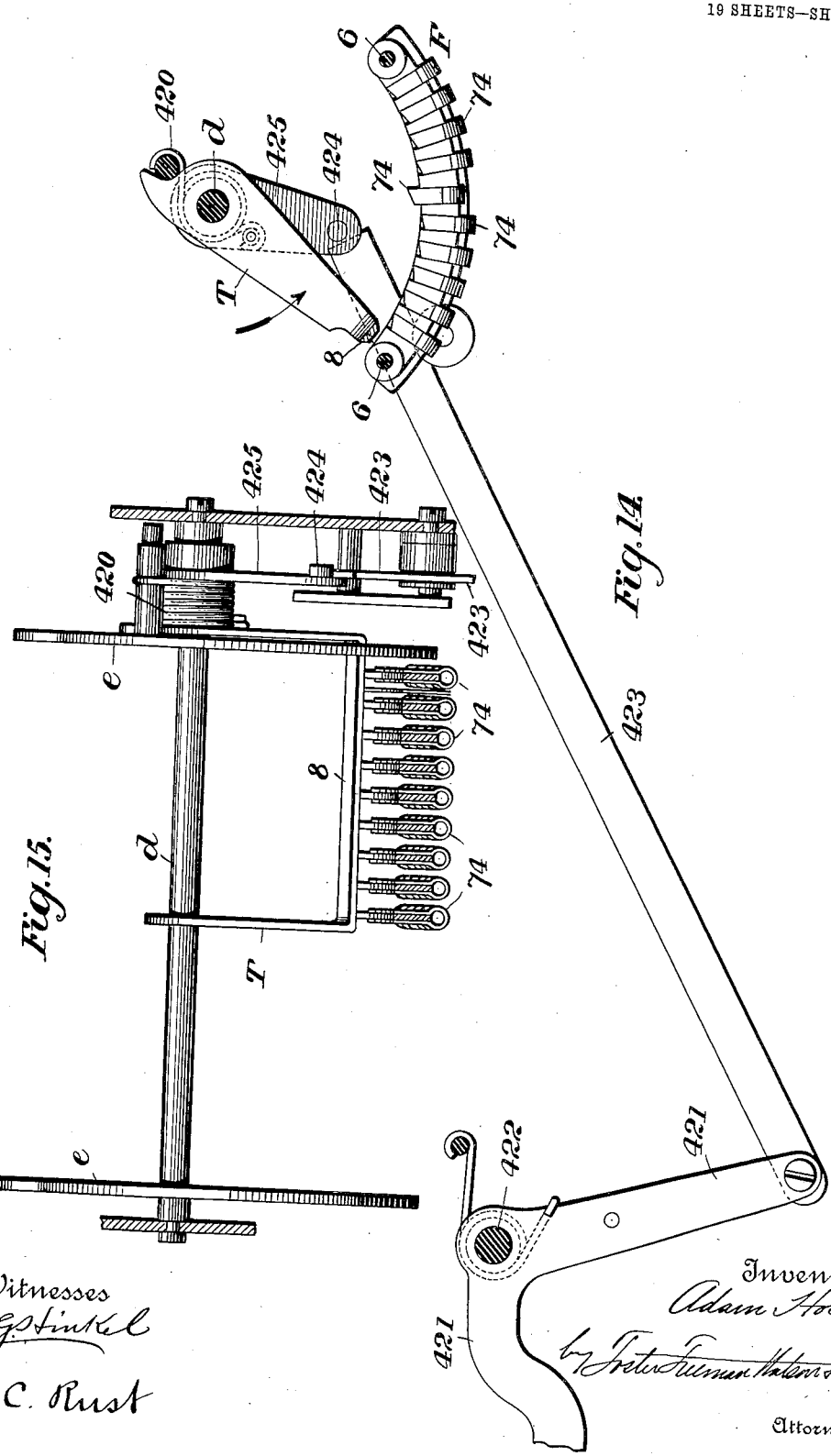

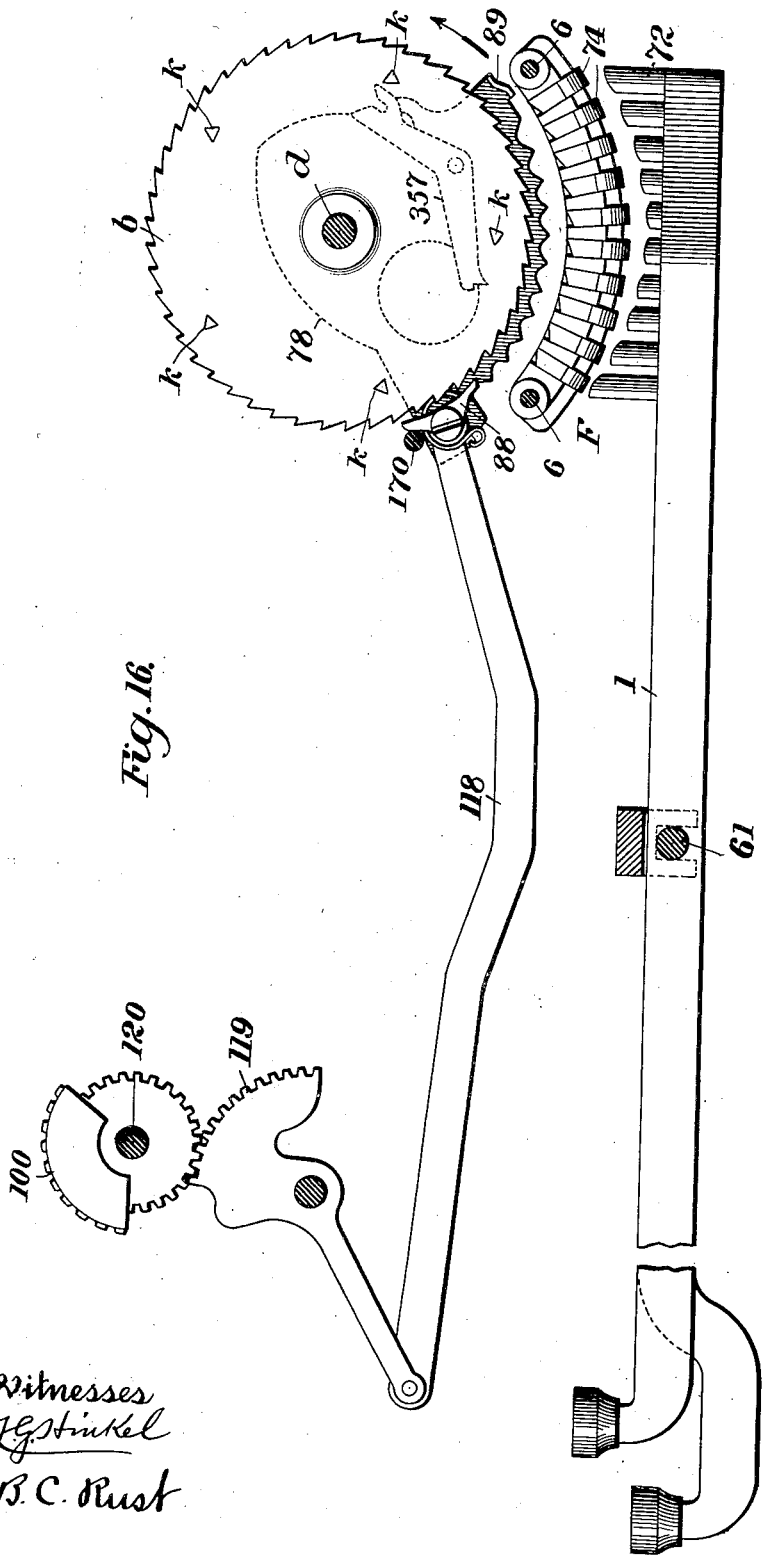

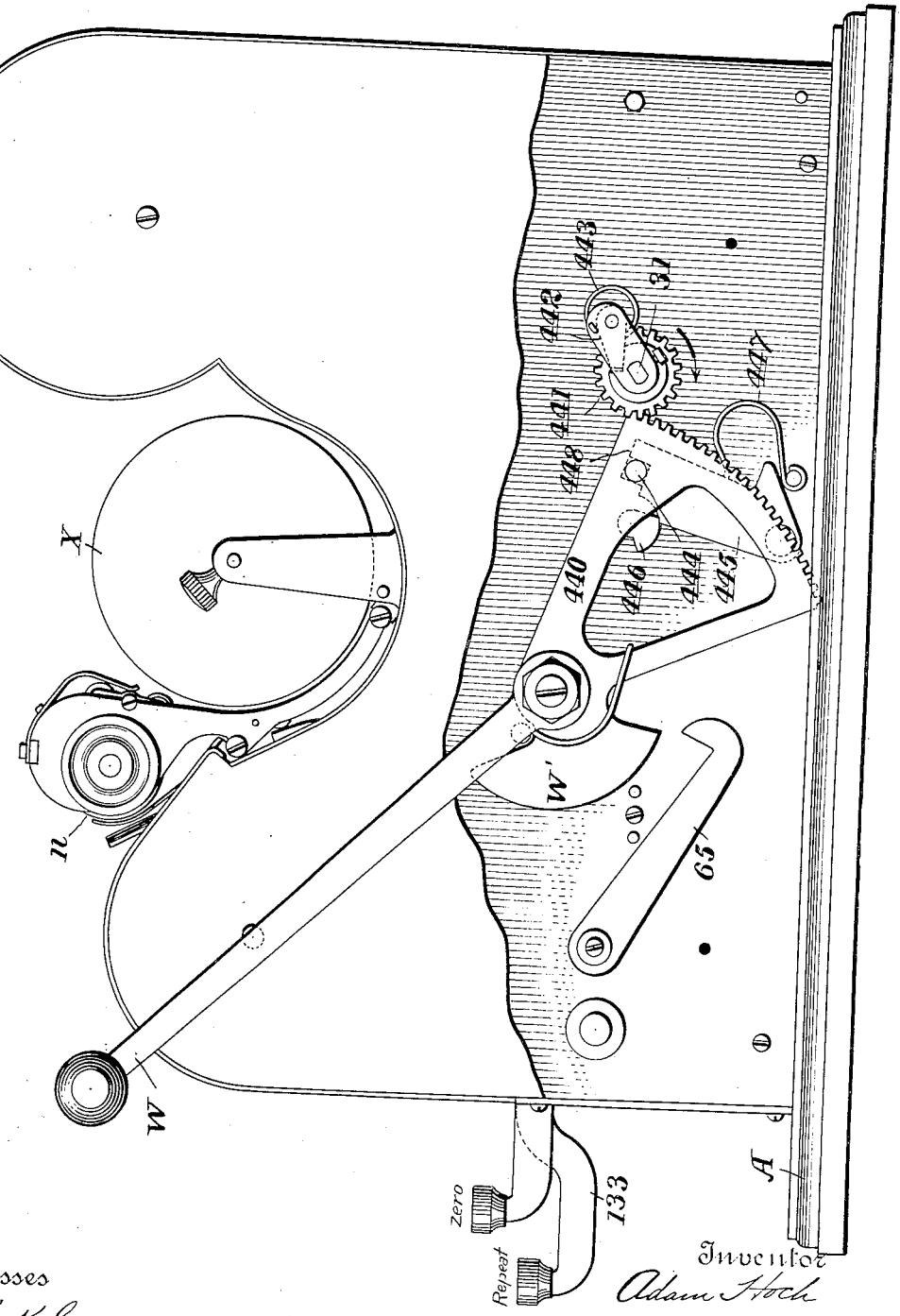

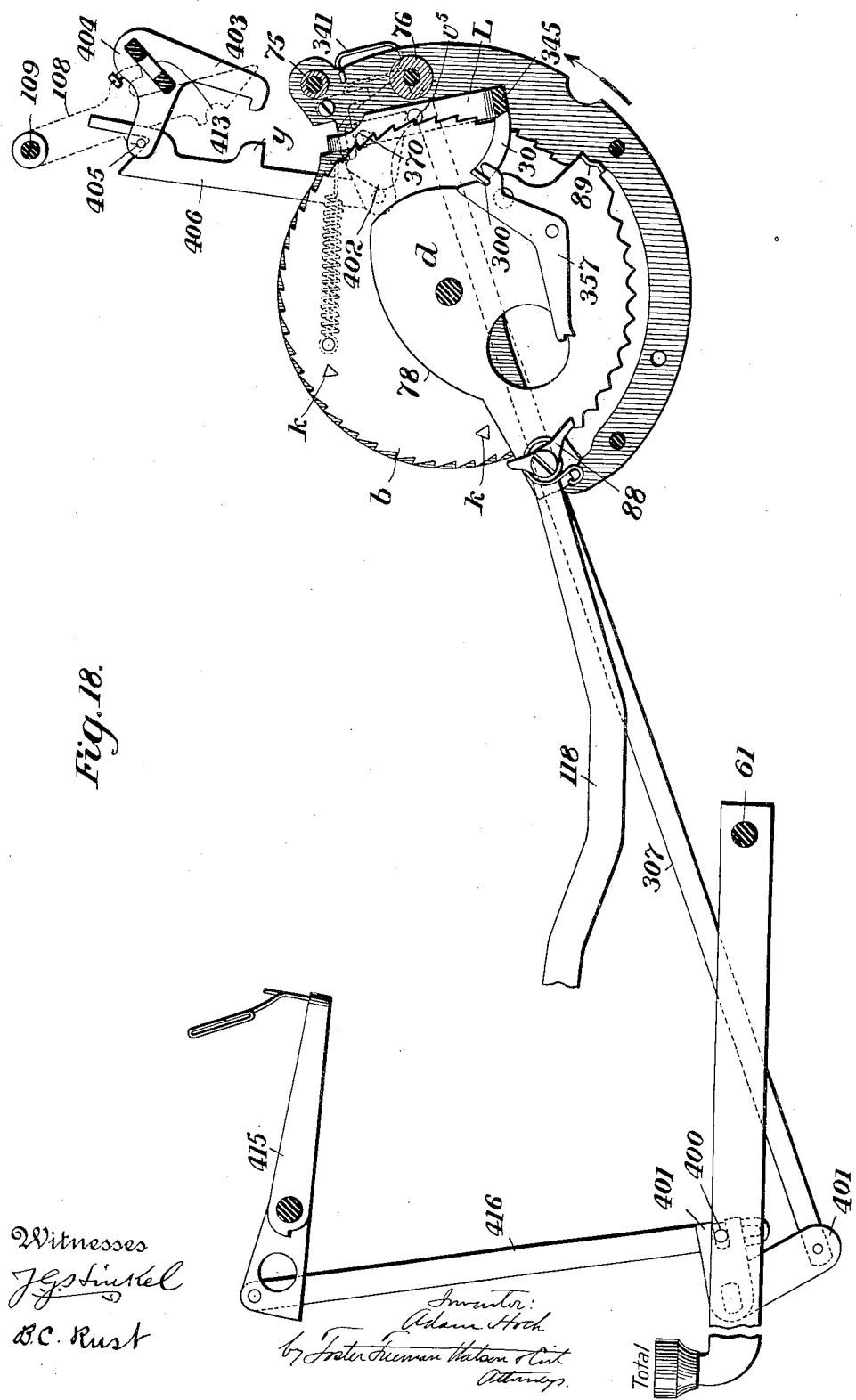

No. 898,411. PATENTED SEPT. 8, 1908.
A. HOCH.
ADDING MACHINE.
APPLICATION FILED SEPT. 18, 1907.

19 SHEETS—SHEET 15.

Witnesses
J.G. Stinkel
B.C. Rust

Inventor
Adam Hoch
by Foster Freeman Watson Hirt
Attorneys

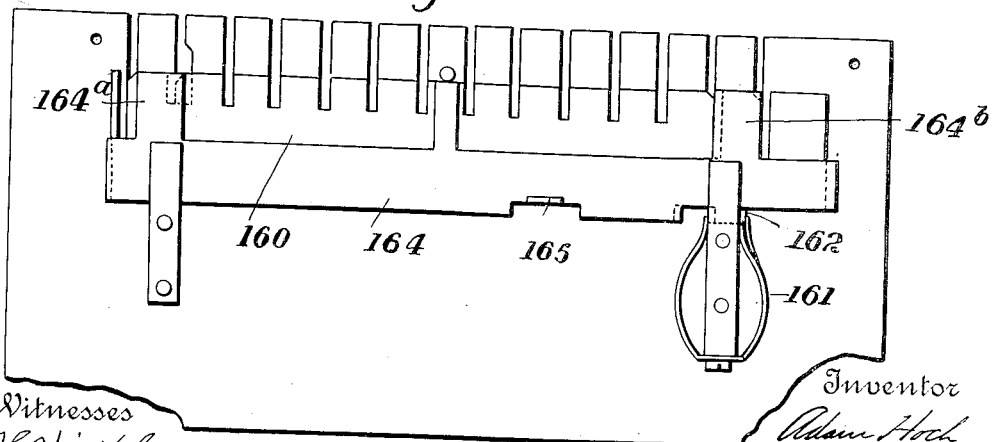

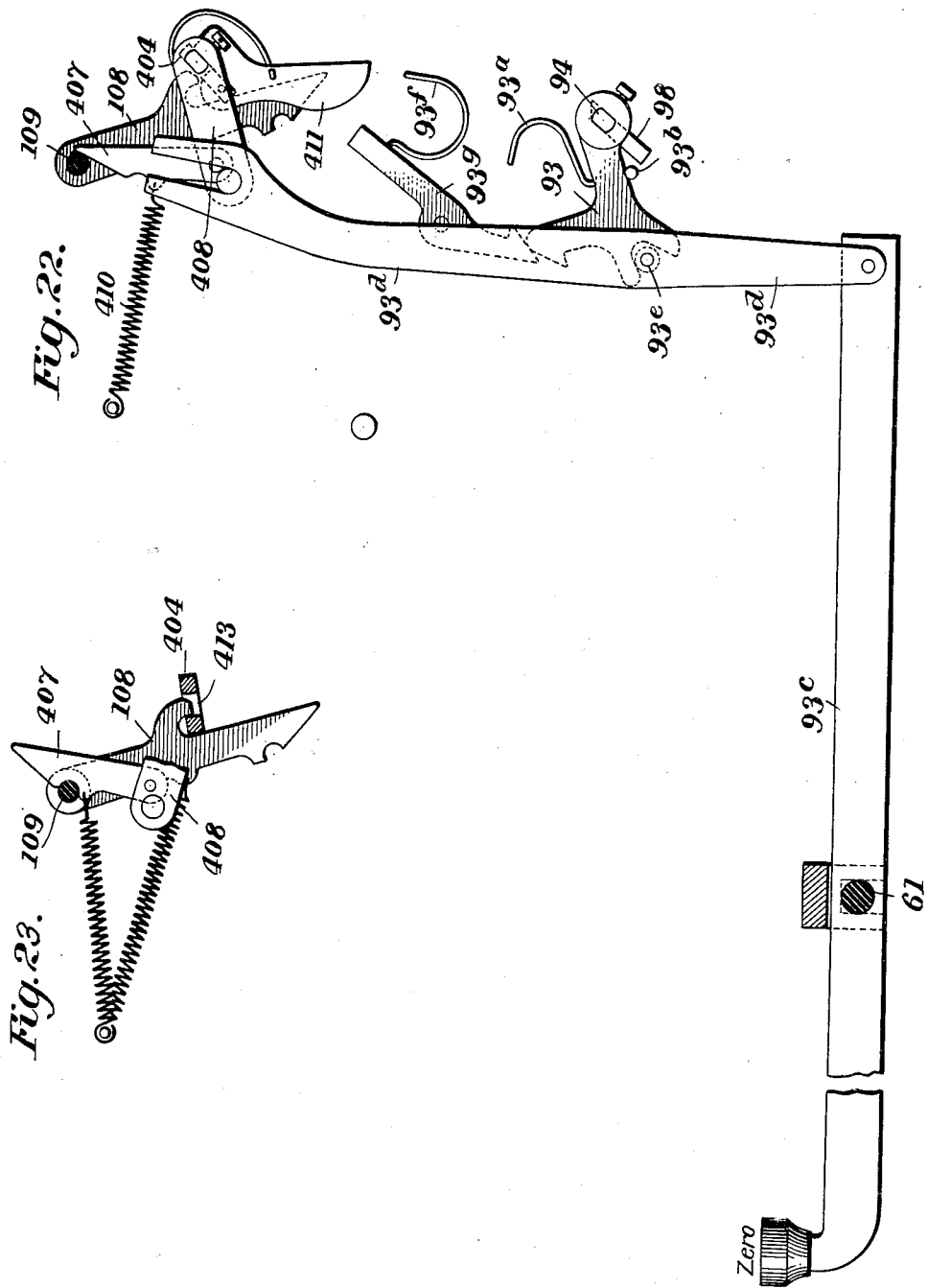

No. 898,411. PATENTED SEPT. 8, 1908.
A. HOCH.
ADDING MACHINE.
APPLICATION FILED SEPT. 18, 1907.
19 SHEETS—SHEET 18.
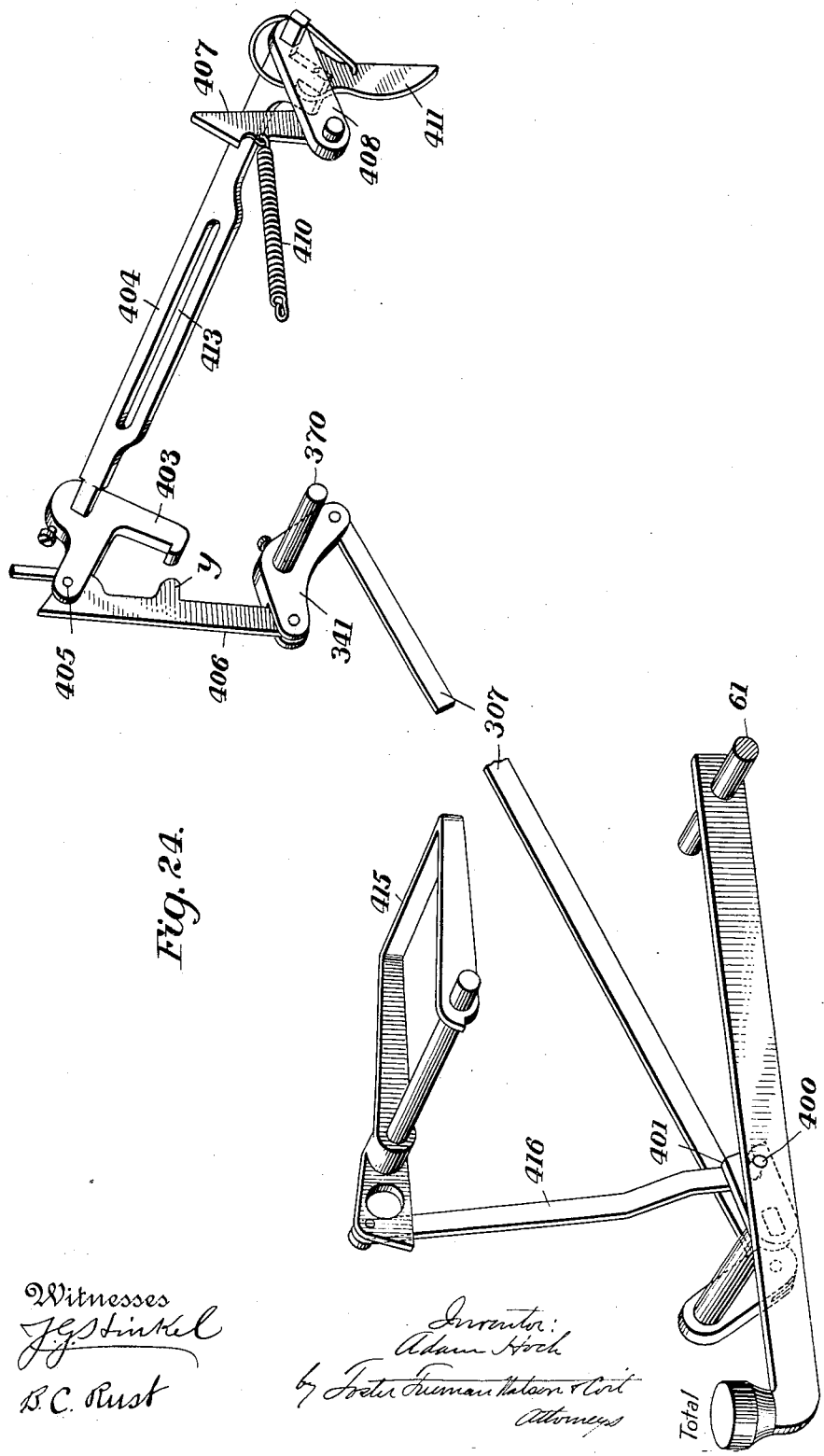

No. 898,411. PATENTED SEPT. 8, 1908.
A. HOCH.
ADDING MACHINE.
APPLICATION FILED SEPT. 18, 1907.

19 SHEETS—SHEET 19.

Witnesses
J.G. Hinkel
B. C. Rust

Inventor
Adam Hoch
by Foster Freeman Watson Hoyt
Attorneys

UNITED STATES PATENT OFFICE.

ADAM HOCH, OF PROVIDENCE, RHODE ISLAND, ASSIGNOR TO WENDLING HOCH ADDING MACHINE COMPANY, OF SAN FRANCISCO, CALIFORNIA, A CORPORATION OF CALIFORNIA.

ADDING-MACHINE.

No. 898,411.      Specification of Letters Patent.      Patented Sept. 8, 1908.

Application filed September 18, 1907. Serial No. 393,512.

*To all whom it may concern:*

Be it known that I, ADAM HOCH, a citizen of the United States, and a resident of Providence, in the county of Providence and State of Rhode Island, have invented certain new and useful Improvements in Adding-Machines, of which the following is a specification.

Figure 1:
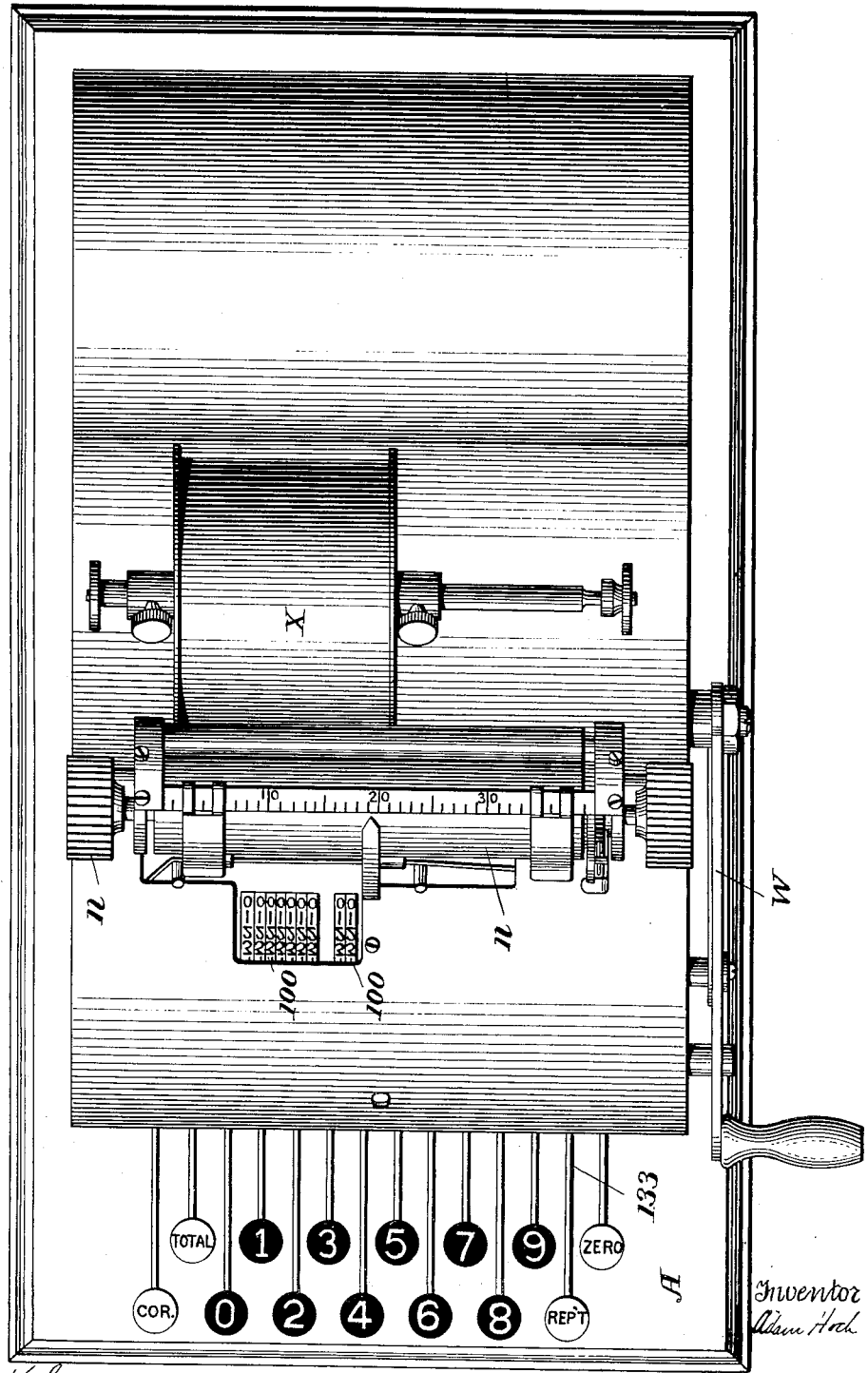
Figure 2:
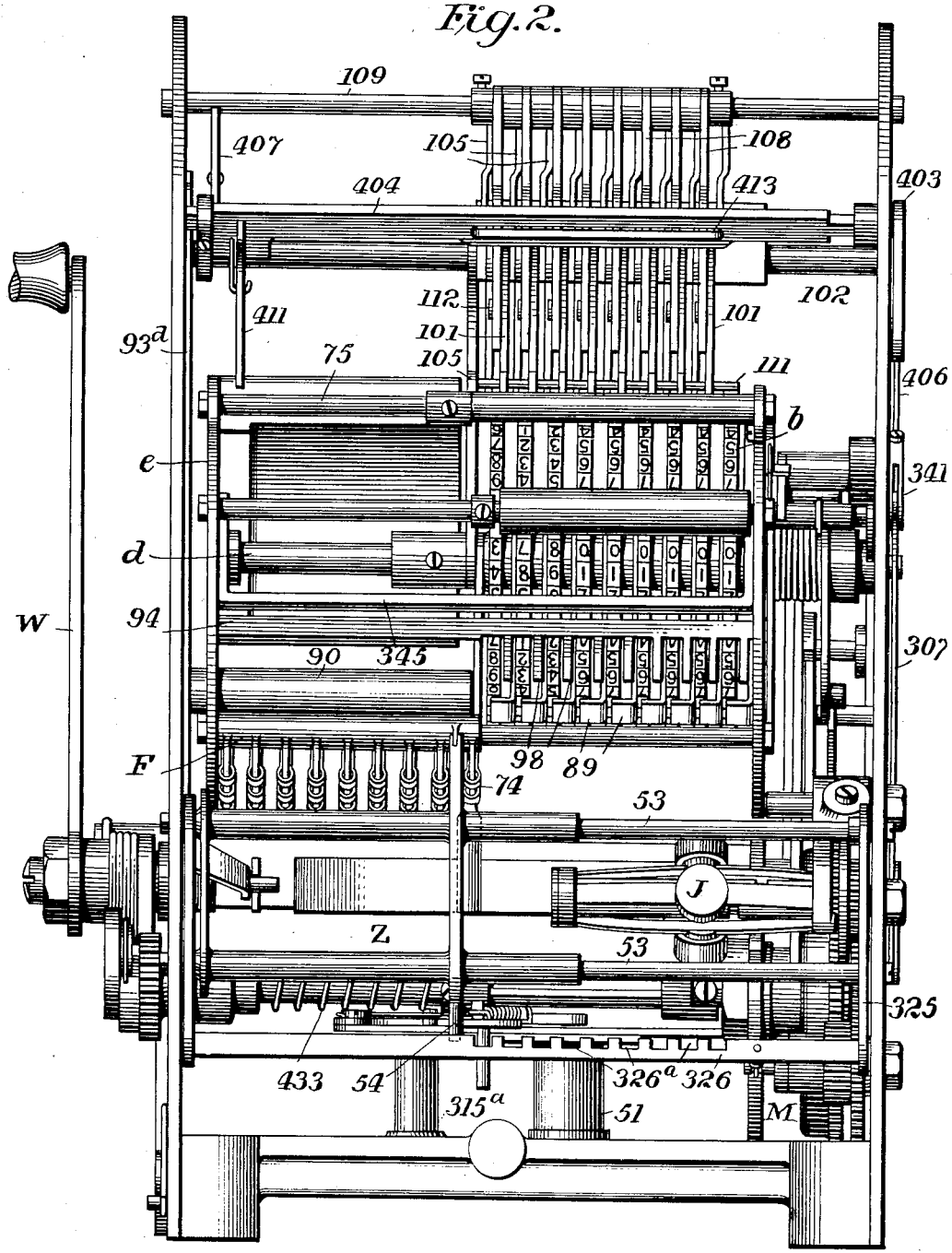
Figure 3:
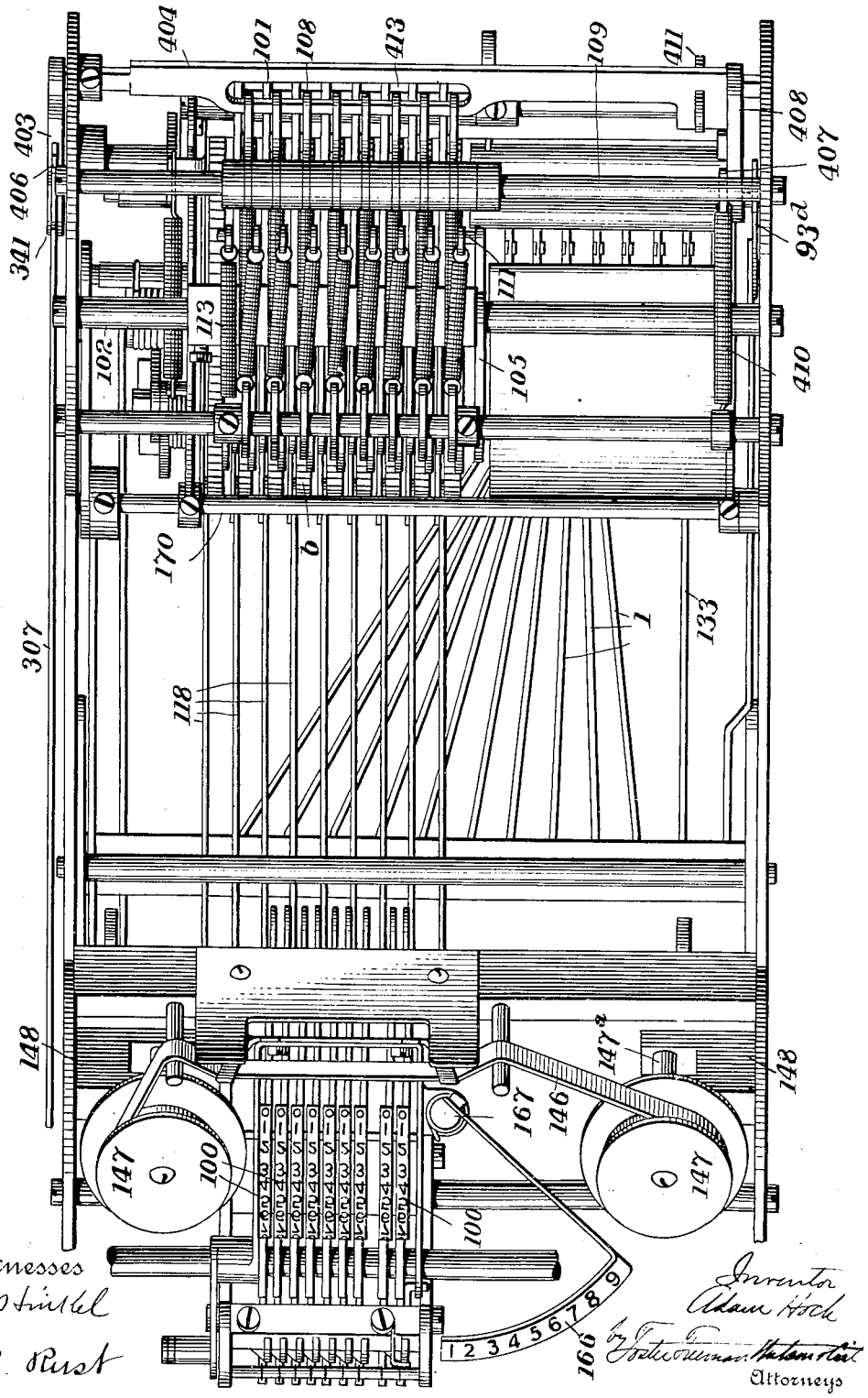
Figure 4:
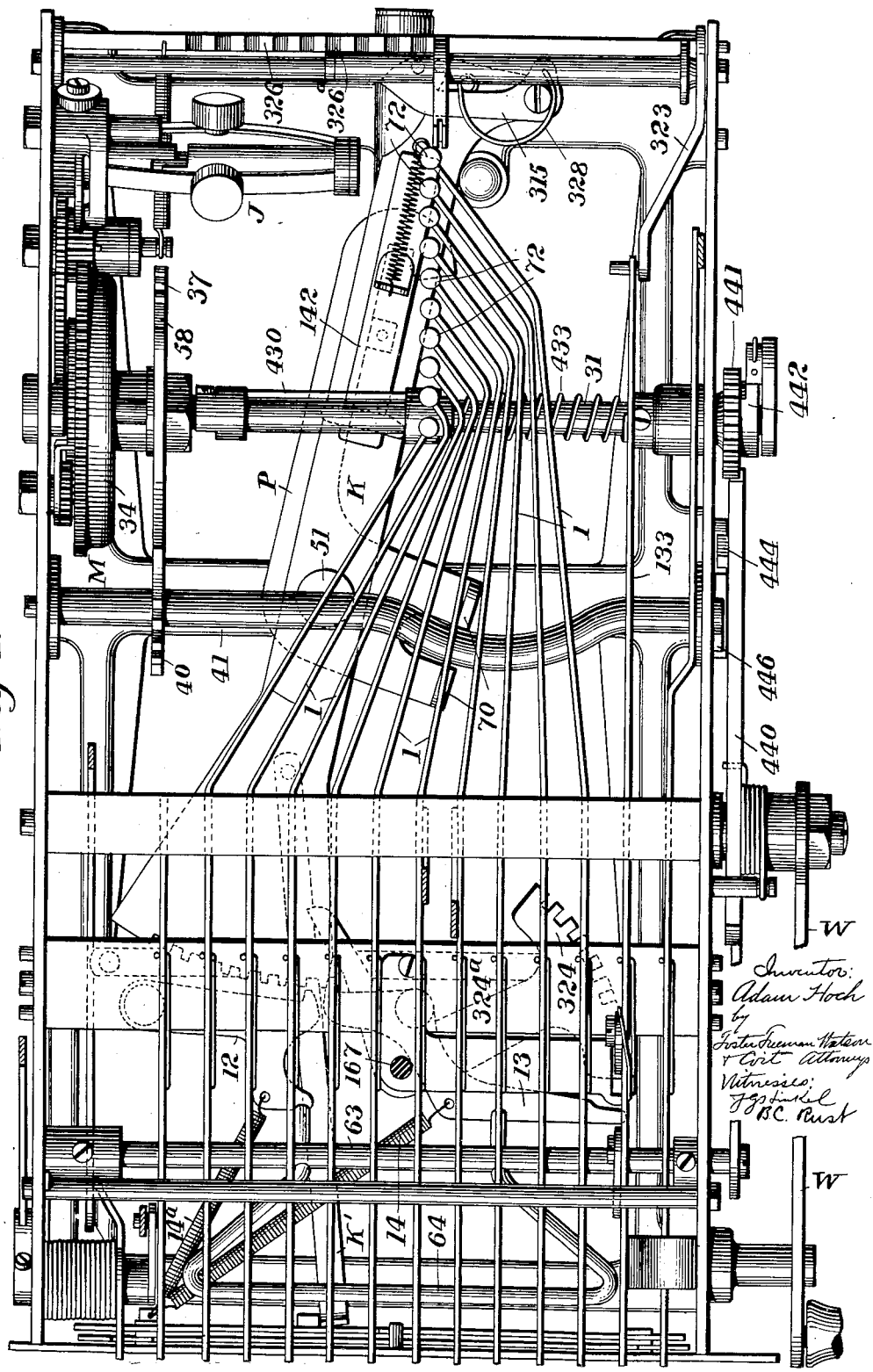
Figure 12:
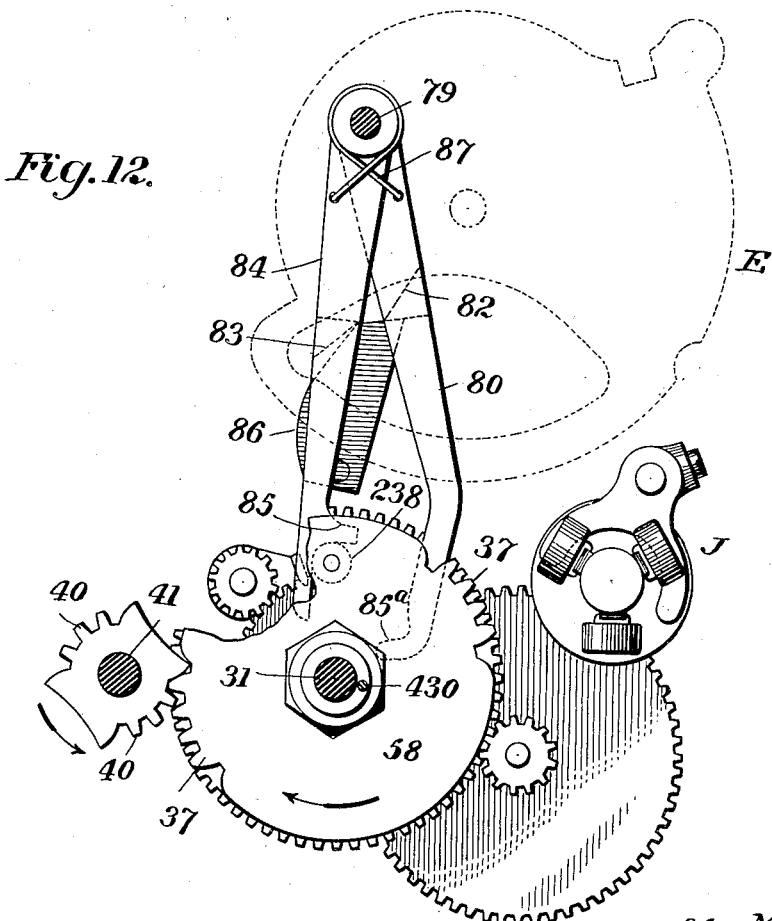
Figure 13:
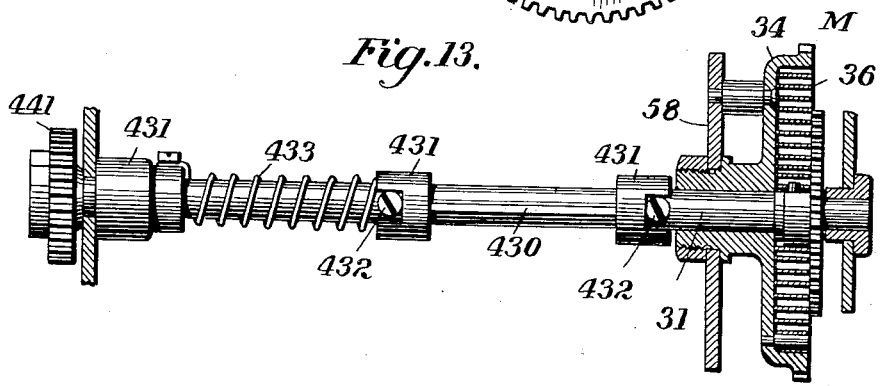
Figure 19:
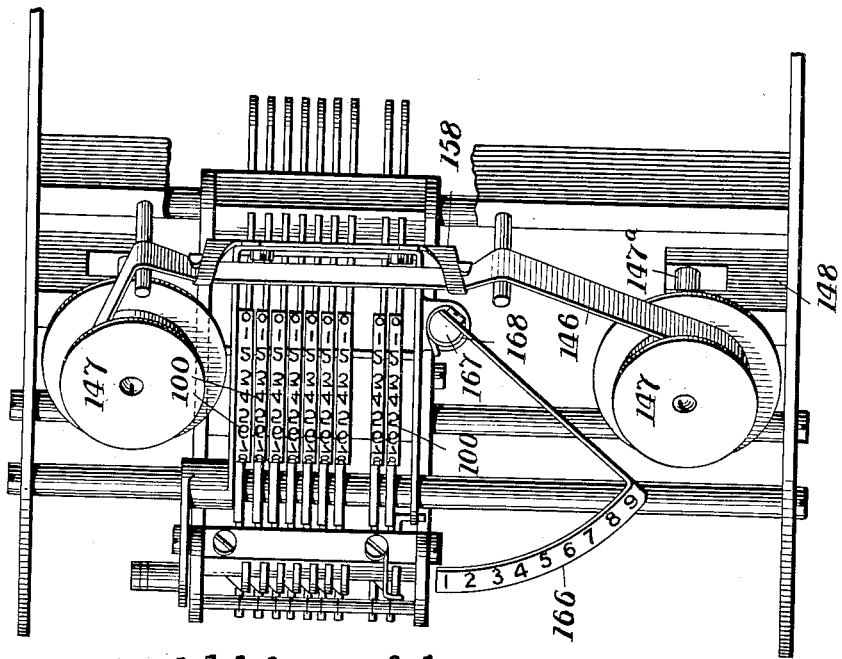
Figure 20:
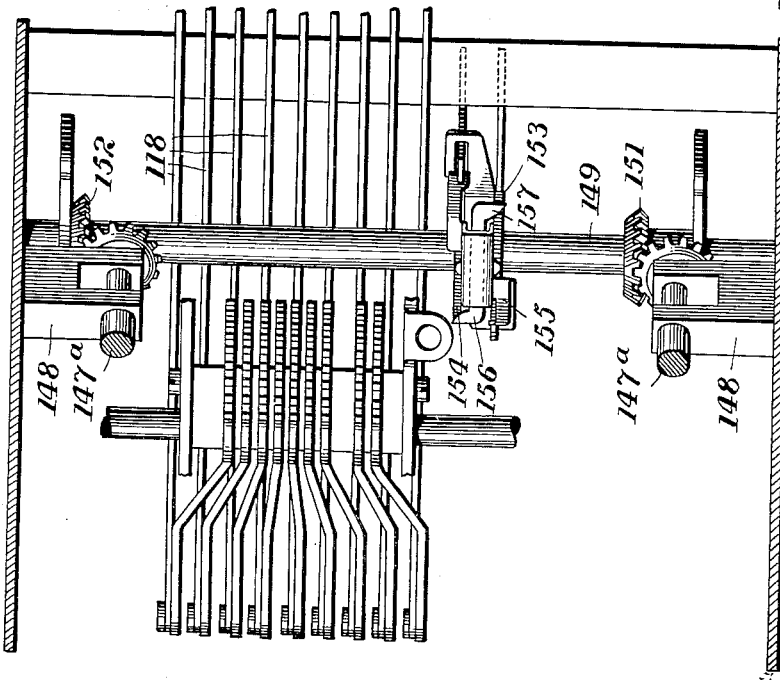
Figure 25:
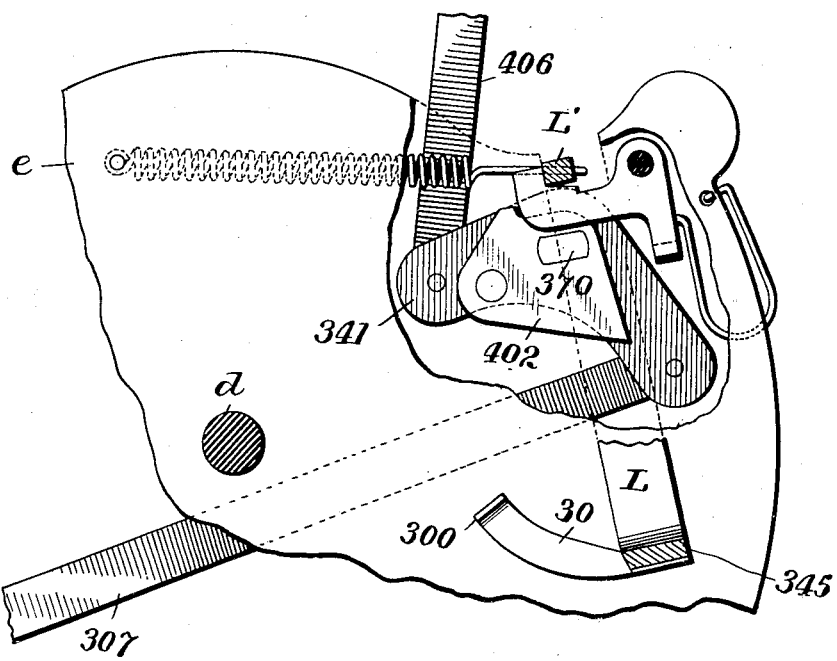
Figure 26:
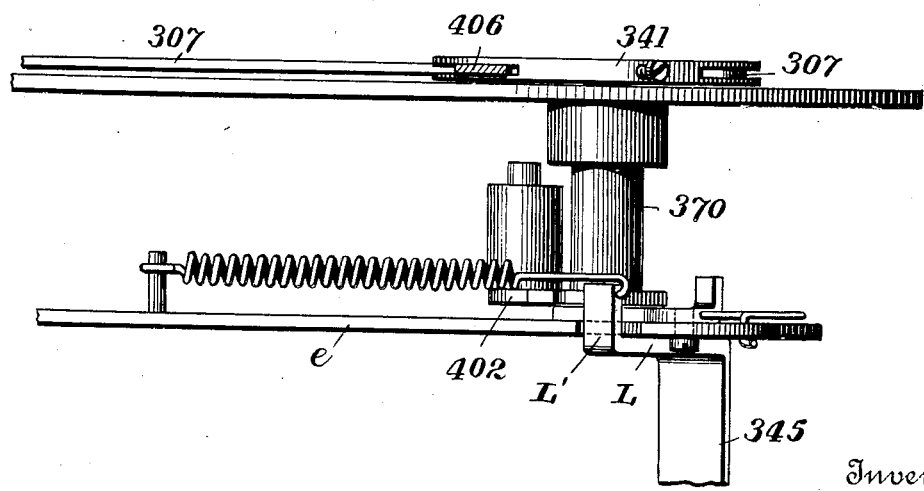

My invention relates to adding and recording apparatus and more especially to that class of apparatus in which a series of adder wheels rotated intermittently in one direction co-act with swinging segments which are connected with the printing mechanism and where the adjustment of the adder wheels results from the depression of a series of ten keys; and my invention consists in certain details of improved construction and arrangement fully set forth hereinafter and illustrated in the accompanying drawings, in which:

Figure 1 is a plan of my improved machine; Fig. 2 is a rear elevation; Figs. 3 and 4 are sectional plans on different planes; Fig. 5 is a plan of the devices for setting the selector frame by the action of the keys and releasing the motor; Fig. 6 is a side view of the locking mechanism; Figs. 7 and 8 together constitute a longitudinal sectional elevation of the apparatus; Fig. 9 is an elevation in part section illustrating the connection between the adding and recording mechanism; Figs. 10 and 11 are side elevations of devices more immediately operating upon the adder wheels; Fig. 12 is an elevation illustrating the devices operating the swinging frame from the motor; Fig. 13 is a transverse section through the motor mechanism showing its connection with the swinging shaft; Fig. 14 is a side view of the correcting device showing the connection of the lever of the correcting key; Fig. 15 is a transverse section illustrating the correcting devices; Fig. 16 is an elevation illustrating the devices for actuating the segments and number wheels and the numeral keys and connections and the connection of the register devices with the segments; Fig. 17 is a side elevation at the right of the machine, with part of the covering plate removed; Fig. 18 is a sectional elevation showing parts connected with the total mechanism; Figs. 19 and 20 are plan views upon different planes of the record mechanism; Fig. 21 is a front elevation of the record mechanism; Fig. 22 is a side elevation of the zero mechanism; Fig. 23 is a detail of parts connected with the zero mechanism; Fig. 24 is a perspective view of parts connected with the total key; Figs. 25 and 26 illustrate in elevation and plan, on an enlarged scale part of the totalizing means; Fig. 27 is a detail elevation of the key locking devices.

The base A of the apparatus supports a suitable casing containing the operating parts, the wheels $b$ of the adder being at the rear, and the indicating wheels or segments 100 of the recorder or register being partly exposed through a suitable aperture in the casing at the front, and coöperating with a cylindrical platen $n$ to print upon a strip of paper carried by a reel X said parts being so arranged that the printing matter is exposed. Outside the casing is an operating handle or hand lever W from which power is derived, and each operation of the machine started as hereinafter described. At the forward end of the machine is a series of numeral keys bearing the numerals 0 to 9, and also a zero key, a repeat key, a correction key and a total key. The general arrangement of these parts and the construction in many respects is very similar to that set forth in my application for United States Letters Patent, Serial Number 266,604, filed June 23, 1905, the present invention relating to certain details of improvements, having for their object to simplify the construction and improve the operation of the apparatus.

*The adder.*—There is a series of adder wheels $b$ turning on a cross shaft $d$, Figs. 8 to 11, and adjacent each wheel on the shaft swings what I term a segment 78, Fig. 18, carrying a pawl 88, which, when the segment swings in the direction of the arrow, Fig. 16, engages the toothed periphery of the adjacent adder wheel $b$. Each adder wheel has a plurality of series of teeth, each series consisting of ten teeth numbered from 0 to 9, five series being shown in the drawing, and each of the segments 78 has ten teeth or shoulders and a terminal projection or shoulder 89.

After depressing any numeral key the coacting segment and adder wheel $b$ will be turned to an extent depending upon the numeral indicated by said key, this resulting from the swinging movement of a selector F Fig. 14, consisting of a curved frame having a series of rows of radially adjustable pins 74, 110 each of which, when pushed inward, will be in a position to contact with the shoulder 89 of the adjacent segment, and will carry the latter, when the selector swings, in the direction of the arrow, Fig. 16. If one of the pins nearest the front of the machine is pushed inward, the selector F, having a definite limit of vibration, will not contact with the shoulder 89 so soon and impart so great a movement to the segment as would result if a pin nearer the back of the machine was pushed inward, and the parts are so arranged that the respective pins will be operated by the respective keys, when the selector is in the position shown in Fig. 16, so as to secure an extent of movement of the segments and adder wheels successively, proportioned to the numeral indicated by the key. As shown, each key is upon a lever 1 carrying a pin 72 and vibrating on a cross shaft 61, and the rear ends of the levers converge so as to bring all the pins 72 in a line with each other parallel to the rows of pins in the selector, Fig. 4. The selector is carried by and slides laterally upon transverse rods 6, 6, of a frame E, swinging about the shaft $d$ as an axis, and consisting of side pieces $e, e$, said cross rods 6, 6 and cross bars 75, 76, Figs. 2 and 9.

The normal position of the selector F is at the right with the inner row of pins 74 above the row of pins or hammers 72, Fig. 2, and on depressing a key after raising a pin 74 the selector moves to the left one step bringing the first row of the pins 74 below the first segment and on the next swinging movement of the frame brings the pin 74, which has been set inward against the shoulder 89, and swings the segment and its coacting adder wheel. The selector carrying frame E then swings back carrying the selector to its original position. If, however, a number of keys are struck in succession before operating the frame E, the selector will be carried to the left a number of steps corresponding to the number of keys operated, so that the pins 74 will be set toward a corresponding number of rows in the selector and will be carried under a corresponding number of segments, and when the frame E is thereafter swung, a number of segments equal to the number of keys depressed it will be carried to a greater or less extent with the swinging selector, and the adder wheels will be turned each to the extent corresponding to the numeral upon one of the keys depressed. Each segment is connected with the recorder by a suitable connection, as by a connecting rod 118, Figs. 9 and 16 so that the corresponding parts of the recorder will be moved to an extent depending upon the movement of the connected segment.

After the frame E swings upward and turns the adder wheels the selector slides towards the right or returns to normal position laterally of the machine, and as it swings downward it brings the inner ends of the pins 74 against a cross pin 90, Figs. 2, 10 and 11, which extends from the side of the machine, nearly to the first adder wheel at the right, passing through a slot in the adjacent plate $e$, the pins that have been set inward being thereby all forced outward. As there are five series of numbers on each adder wheel the limit of movement of the latter at each operation of the machine does not exceed one-fifth of a full rotation, but the movement of the adder wheels is always in the same direction, while the movement of the segments is an oscillating movement, and as each pawl 88 is brought to its terminal forward position it makes contact with a stationary cross bar or shoulder 170 Fig. 9 which throws it out of engagement with the teeth of the adder wheel, a spring, 88$^a$ Fig. 11 which bears upon the pawl, throwing it into such engagement when the pawl leaves the cross bar.

*Carrying mechanism.*—In order that each adder wheel may be moved one step as the one indicating the next lower denomination is moved in excess of nine steps, I make use of the mechanism best illustrated in Figs. 10 and 11. S shaped pawls 104, hung to a cross shaft 102 supported by the frame of the machine, prevent any reverse movement of the adder wheels, with the toothed periphery of which they engage under the action of springs 113. Upon the shaft 102 are hung curved levers 101 each with its front end beveled so as to be engaged and elevated by pins $k$ extending from one side of the adjacent adder wheel, there being one pin to each series of digits on the wheel, and said pins being arranged so as to strike the lever 101 as the adder wheel is moved beyond the ninth tooth of each series of steps or numbers thereon. To each lever 101 is pivoted a hook 103 having a beveled end which, in the position shown in Fig. 10, rests upon a cross rod 111 supported by a fixed bracket 105 that is mounted on the shafts $d$ and 102, and above but out of contact with the periphery of the adder wheel next higher in order and beyond the one the pins of which will strike the lever 101, to which the hook 103 is pivoted. Each lever 101, after being moved to a slight extent by the contact of one of the pins $k$, will receive its final operation from a motor actuated by a spring 114, said motor consisting of an arm 108 swinging on a cross shaft 109 and having a beveled cam edge which will be brought to bear upon a roller pin 112 at the side of the lever 101 whenever the latter is moved to carry said roller pin out of a notch in the cam arm 108. Normally with the parts in the position shown in Fig. 10 and before any adding operation the ends of the levers 101 are above the cross rod 75 of the swinging frame E.

On each lever 101 is an angular pin or lug 101$^a$ which, in the position shown in Fig. 10, is below a shoulder $r$ of a detent 106 hung to a cross shaft 107, the lower end of the detent being in a position to be struck by the cross bar 75 when the frame E swings to the position shown in Fig. 11. At each upward and forward movement of the frame E the cross bar 75 contacts with the ends of the detents 106, and swings the latter forward, but this produces no other effect when the parts are in the position shown in Fig. 10. If, however, during an operation of the machine one of the pins $k$ strikes the end of the lever 101 extending into its path, said lever will be swung slightly in the direction of the arrow, Fig. 10, carrying the lug $101^a$ to shoulder $r$ and depressing the pin 112 from the notch in cam lever 108. This movement of the lever 101, which is sufficient to bring the pin 112 beneath the cam surface 110 of lever 108 is limited by the shoulder $r$, and carries the hook 103 away from the cross bar 111 and allows it to drop onto the toothed periphery of the next higher adder wheel. As the frame E completes its upward movement the cross bar 75 thereof strikes the detents 106 and swinging out the detents releases such of the levers 101 as have been adjusted as above described by the pins $k$, and when thus released the action of the springs 114 causes the levers 108 to impart an additional movement to said levers 101 sufficient to move the wheel or wheels engaged by the hooks 103 one step. During the return movement of the frame E the cross bar 75 lifts the rear ends of the levers 101 thus restoring the parts to the positions shown in Fig. 10 with the lugs $101^a$ beneath the shoulders $r$ and the hooks 103 resting on rod 111, the latter being beveled at their rear ends so as to ride up on said rod as the hook is carried rearwardly by the lever 101.

*Zero mechanism.*—The frame E carries a rock shaft 94 having a series of parallel fingers 98 which extend between the adder wheels when the shaft is in the position shown in Fig. 11, to contact with the pins $k$. When, therefore, after thus setting the shaft 94 and its fingers the frame E is swung upward; the stop pins $k$ of all the wheels that have been moved one or more steps will be met by the set fingers and the wheels turned as the frame E moves upward. The pins $k$ will be engaged at different points in the travel of the frame E and fingers 98, depending on the extent of movement of the wheels $b$ prior to actuating the zero mechanism; but the upward movement of the frame E is such that the engaged stops $k$ will all be in alinement at the termination of such movement, and consequently corresponding figures on the wheels will be brought into line.

In order to set the shaft 94 I make use of parts set by the zero key, as best indicated in Fig. 22. The shaft 94 carries a forked arm 93, a spring $93^a$ tending to keep the arm against a stop $93^b$, and the zero key is upon a lever $93^c$ to which is pivoted a vertical link $93^d$ having a stud $93^e$ adapted to enter between the diverging horns or forks of the arm 93, so that on depressing the zero key the link is elevated, swinging the arm 93 in the direction of the arrow, Fig. 22, and thereby setting the fingers 98 in position to make contact with the pins $k$ when the frame E is moved upwardly. The shaft 94 and the connected parts are retained in this position by a hooked catch $93^g$ which engages a hooked projection of the arm 93 under the action of a spring $93^f$, and until the tail of the catch $93^g$ is released by contact with a stud $93^h$ extending inwardly from the adjacent side frame. Said stud also in connection with a corresponding stop at the other side of the machine acts to positively limit the upward movement of frame E. After the frame E completes its forward movement, the spring $93^a$ will restore the arm 93 and its pins to their first position to permit the forks of the arm 93 to receive the stud $93^e$ between them when the frame swings down.

*Totalizing means.*—Inasmuch as each segment swings back to normal position at the end of each operation the connected recording sectors, wheels, or other devices, whatever they may be, are restored to normal or zero position at the end of each operation, but the adder wheels are moved forward to different extents, according to the different amounts added, and an indication of the total may be had by swinging the segments forward in proportion to the extent to which the different type wheels have been moved. This is effected by providing each segment with a contacting device, as for instance, a bent lever 357 which may be set within the path of the pins $k$ of the corresponding wheel $b$ (see especially Fig. 18) and then turning each wheel one-fifth of a rotation. It will be obvious that the number of steps to which each wheel is turned after a pin $k$ thereon makes contact with the end of the lever 357 will carry the connected segment the same number of steps forward.

In order to carry all the type wheels together one-fifth of a rotation, as described, I make use of a bail L Figs. 18, 25 and 26 pivoted at $v^5$ to the frame E and having a crossbar 345 which, when the bail is thrown inward, will engage the teeth of all the wheels and a plurality of arms 30 which extend from said cross bar into the spaces between the wheels and each terminate in a lip 300 adapted to enter a V-shaped notch at the upper end of the coacting lever 357 so that when the bail is swung inward for its bar 345 to engage the adder wheels, it will swing the levers 357 in such position that their lower ends will be in the paths of the pins $k$. The lips 300 on the arms 30 will by this movement of the frame E be carried away from the levers 357 which have, however, been previously adjusted into position to be engaged by the pins $k$. After the pins $k$ contact with the levers 357 the segments and wheels will move together throughout the remainder of the upward movement of the frame E. The extent of such movement of any segment and of the member of the recording devices connected therewith will depend upon the distance which the operative pin $k$ has been moved by previous operations of the machine. For example, if one of the adding wheels has been turned two steps, one of the pins $k$ will have passed beneath the forward end of lever 357 and the next one of said pins will not engage said lever until the wheel has been turned eight steps by the bail L. Therefore said wheel will only be connected with its segment, through the pin $k$ and lever 357 during the remaining two steps of the movement of the wheel, and the member of the recording devices connected with said segment will be turned but two steps or caused to properly indicate the extent of movement of its associated wheel $b$ prior to the taking of a total.

The bail L is operated from the total key in any suitable manner, as, for instance, shown in Fig. 18, where a pin 400 upon the side of the total key lever enters a notch in one arm of a crank lever 401 pivoted at one side of the frame and connected by a rod 307 with a crank lever 341 Fig. 25 pivoted upon a short rock shaft 370 rocking in bearings of the side frame. On the shaft 370 is a cam plate 402 having a shoulder in position to engage a shoulder L' at the upper arm of one arm of the bail L and when the connecting rod 307 is drawn in the direction of its arrow the shaft 370 is rocked and the shoulder of the cam plate, by contact with the shoulder of the bail, swings the lower end of the latter forward and the front ends of the levers 357 downward. As the parts are set in this position they should be locked, and this locking is effected by means of a hooked catch 403 Figs. 8 and 24 upon a cross bar 404 turning in the side frames and having an arm with a pin 405 which is engaged by the shoulder of a link 406 pivoted to one arm of the lever 341, the link having a shoulder $y$ which is engaged by the hook when the link is raised. The parts are retained in this adjusted position by means of a friction dog 407 pivoted to an arm 408 upon the rock bar 404 adjacent the opposite end thereof from the hook 403, which dog has a notch for engaging the cross bar 109 Fig. 18 under the action of a spring 410, when the bar 404 is rocked and the hook 403 engaged with the link 406. The parts are unlocked from this position when the frame E swings back by the contact of the cross bar 75 thereof with an arm 411 upon the cross bar 404.

It is important in bringing the parts to the positions indicated, for the purpose of taking a total, to prevent the motor cam arms 108 Fig. 23 from operating, and therefore each of the latter is provided with a hook 412 and the cross bar 404 is provided with a slot 413 so situated that when the crossbar is turned to lock the parts in place in taking a total, the hooks 412 enter the slots 413 and prevent any movement of the cam arms.

*Correcting device.*—If an error is found after pressing any key or keys and before printing, the pins 74 which have thus been set up may all be restored to normal position by means of the cross bar 8 of a bail T, Fig. 14 swinging on shaft $d$, which bail is carried to its normal position by a spring 420, and is swung in the opposite direction by depressing the correction key which is at the end of a bell crank lever 421 pivoted to a cross bar, 422, the other arm of said lever being pivoted to a push bar 423, the rear end of which is adapted to be moved against a stud 424 upon an arm 425 swinging upon the shaft $d$ and connected to the bail T to swing therewith.

*The recorder.*—The type carrying segments 100 of the recording mechanism Fig. 9 each constitute part of a gear with which meshes a sector 119 which is connected with a segment 78 by the connecting rod 118. As will be apparent, each type carrier will be turned from normal position in accordance with the movements of its segment 78. The several wheels carrying the type segment are each loosely mounted on a stud or pin 120 projecting laterally from a carrier 121, all of said carriers being fulcrumed on a crossbar 122 mounted in the sides of the machine frame and each having its rear end connected by a spring 123 with a stationary plate or bar 124. At the forward end each carrier 121 is adapted to be engaged by a swinging dog suspended from a rod 126, and with each of said carriers co-acts a trip or release lever 127 having an arm 128 extending rearwardly and bearing upon the forward edge of the corresponding sector 119. The release levers 127 are all mounted on a shaft 127$^a$ supported in the side frame 129 Figs. 3 and 7 of the record mechanism and each of said levers is normally held in position where its arm 128 will engage a sector 119 by a coiled spring 130. Each of the dogs 125 is provided at its forward edge with a laterally deflected lip 125$^a$ which extends across the forward edge of the co-acting trip lever 127 Fig. 3. That is, as the trip levers are arranged at one side of the carriers 121, the locking dogs are provided with laterally deflecting sections in order that the carriers 121 may be properly released as usual.

The carriers 121 are normally held in the position shown in Fig. 9, against the tension of their springs 123, by a swinging frame consisting of two levers 131, fulcrumed on the side plates of the machine, and a cross rod 132, which contacts with the forward edges of the depending rear ends of said carriers 121. At their lower ends the side members 131 of said frame contact with cams 41ª mounted on the shaft 41. The cams 41ª are of such shape that during the portion of the revolution of the power mechanism which results in raising the frame E and turning the type carriers 100 and adding wheels $b$ and in accordance with the numeral keys that have been previously depressed, the cross bar 132 will be held in such position as to maintain the springs 123 under tension. Immediately following the proper positioning of the type carriers the arms 131 will be released by the cams and the springs 123 will instantly operate to swing the carriers 121, which have been released from their holding dogs 125, to bring the type carriers connected therewith against the printing ribbon and platen.

*Paper feed.*—The paper carried by the reel X passes therefrom about the platen $n$. At one end the platen is provided with a ratchet 20 with which engages a feed pawl 21 carried by a swinging frame 22 mounted to vibrate on the platen shaft, and having at its lower end a laterally projecting stud 23 extending into the path of an arm 24 extending upwardly from a swinging frame 25 which is mounted in the sides of the platen supporting frame. With said frame 25 contact two arms 26 secured to a rock shaft 27, one of said arms 26 having a depending member 28 which is connected by the rod or link 29 with a lever 29ª fulcrumed on the rod 170 and having at its opposite end a hook 29ᵇ which engages a pin 29ᶜ connected with one of the side plates $e$ of the swinging frame E. A spring 28ª acts to normally hold the arms 26 against the swinging frame 25. As the frame E swings in the direction of its arrow Fig. 9, the stud 29ᶜ lifts the arm 29ᵇ and through the connections 29ª, 29, 28, 26, release pressure on the lever 25, 24, and the spring 22ª swings the frame 22 to carry forward the pawl 21. As the frame E swings back the movement of the arm 29ᵇ and connected parts is reversed, the lever 25, 24, swings the frame 22 to cause the pawl 21 to turn the ratchet wheel 20 and its platen one step.

*Ribbon feed mechanism.*—The printing ribbon 146 Figs. 3 and 7 is mounted on two spools 147 supported by spindles 147ª mounted in brackets 148 attached to the side frames of the machine, each of said spindles being provided at its lower end with a beveled pinion 151ª Figs. 19, 21. Mounted on the rock shaft 127 are two sleeves 149, 150 to the outer ends of which are secured beveled pinions 151, 152, each meshing with one of the pinions at the lower end of the ribbon spool spindles. At their inner ends said sleeves are provided with ratchets 153, 154, Figs. 20, 21 respectively, and to the rock shaft 127 between said ratchets 153, 154 is secured a block 155 which carries two feed pawls 156, 157 adapted to engage respectively with said ratchets 154, 153. As the shaft 127 is rocked the pawls 156, 157 will engage their respective ratchets and turn the sleeves 149 and 150 to rotate the spool spindles and wind the ribbon 146 from one spool to the other. The ribbon extends through guides 158 Fig. 19 carried by a bail 415 Figs. 18, 24 which is connected with the total key of the machine to be lifted whenever said key is depressed and preferably the ribbon is a bichrome or two-colored ribbon, whereby the totals recorded by the machine will be in a different color from the items. As shown, the connection between said bail and total key includes a link 416 having its upper end connected with the bail and provided at its lower end with a sleeve through which extends a pin 400 which projects laterally from the total key lever.

*Key lever lock devices.*—Means are provided whereby it is impossible to depress any of the numeral keys after one of the special keys (*i. e.*, the total key, correction key, repeat key and zero key) has been depressed until after the machine has been operated. As shown, this locking means consists of a slide 160 Figs. 5, 7, 27 mounted in guides on the rear face of the front plate of the machine and having in its upper edge recesses or notches $s'$ corresponding to the notches in said front plate through which the numeral key levers extend. Said slide is also provided with notches $s^2$ to receive the levers of the special keys, but normally such notches are out of alinement with the corresponding notches in the front frame plate. The slide is yieldingly held by a pair of springs 161 between which there extends an ear 162 depending from said slide. The upper end of one wall of the notches provided in said slide for the special keys is beveled and such beveled surface normally extends across the notch in the front frame plate through which said key lever extends. Therefore, when any of said special keys is depressed its lever, contacting with the beveled surface, will move the slide 160 longitudinally and thus bring the notches therein out of alinement with the notches in the front plate thus preventing the depressing of any other key. When a special key rises or is restored to normal position, the springs 161 return the slide to its normal position. A second slide 154 is preferably arranged in rear of the slide 160, being held in normal position by the springs 161, said springs being bifurcated to provide two sets of fingers, one acting on the slide 160 and the other on the slide 164. From said slide 164 projects an ear 165, which is adapted to contact with the forward end of the bar K', Figs. 2, 5 and 7 which end is preferably bent upwardly, as shown.

Normally the slide 164 is held in such position by the lever K' against the action of springs 161, that upwardly extending ears 164ᵃ, 164ᵇ Fig. 27 extend respectively beneath the levers of the correction and repeat keys so that it is impossible to depress either of these keys. As soon as a numeral key is depressed, however, the lever K' moves away from the lug 165 and said slide is then, through the action of the springs 161, shifted so as to release the correction and repeat keys and bring its ears 164ᵃ, 164ᵇ respectively beneath the total and zero keys, thereby locking or preventing actuation of said keys until the lever K' and slide 164 have been restored to their original positions by an actuation of the handle W, as hereinafter described.

*Selector position indicator.*—As the selector is moved laterally by the depression of successive numeral keys, a slide is automatically moved across a slot in the casing of the machine to indicate the extent of such lateral movement of the selector. This slide or indicating device consists of a curved arm 166 Figs. 4, 7, 21 which is mounted at the upper end of a vertical rock shaft 167 to which is connected a spring 167ᵃ acting to normally hold said slide 166 in the position shown in the drawings, or at one side of the slight aperture or slot in the machine casing. To the lower end of said shaft is connected a bell crank 324ᵃ, carrying a rack 324 and one arm of which extends into the path of the bar K' connected with the actuating lever K hereinafter referred to. Whenever a numeral key is depressed, said lever K and bar K' are moved laterally and through the bell crank 324ᵃ a corresponding movement is given the curved arm 166. The latter has on its forward face numerals from 1 to 9 and as the selector is fed laterally step by step said numbers will be displayed through the said aperture or slot in the machine casing, the number visible at any time indicating the highest number of step by step movements which have been previously imparted to the selector. Following each operation of the machine as the bar K' returns to normal position, the spring 168 will return the shaft 167 and indicator arm 166 to the positions shown in the drawing.

*Actuating device.*—While the hand lever W is employed for storing up power and for releasing the parts at the proper time, and while the numeral keys at the front of the machine also serve to set the pins of the selector, and further to release the mechanism which moves the selector step by step, the other movements of the parts are effected through the medium of the stored power.

*The motor.*—As shown, there is a motor M, Figs. 4 and 13, having a casing 34 turning upon a shaft 31 to which is connected one end of a spring 36, Figs. 12 and 13, the other end of said spring being secured to the casing, so that upon turning the said shaft, and winding up the spring, power is stored tending to rotate the casing. The periphery of the casing 34 is formed into a spur gear 36ᵃ which, through suitable gearing, drives a speed governor J of suitable character that controls the rate of movement of the parts. Connected with the casing 34 is a disk 58 and at opposite points of the periphery of the said disk are sectional gears 37, 37, adapted to engage similar gears 40 upon a counter shaft 41, the gears 37, 37 and 40, 40, engaging in the manner of an ordinary Geneva stop, so that as the disk 58 rotates in the direction of its arrow, Fig. 12, it will rotate the shaft 41 one-half a revolution, and then bring it to a stop during the continued movement of the disk 58, when the engagement with the other set of gears will then turn the shaft 41 another one-half revolution and bring it to a state of rest. The disk 58 rotates once and then stops in the position shown in Fig. 12. This rotation is the means of first rocking the frame E in one direction and then in the other, to which end two pawls 80, 84 are employed. Said pawls are supported by a pin 79 projecting from one side of the frame E, one pawl having a shoulder 85 and the other a hook 85ᵃ, and upon the disk 58 is a stud 238 which, as the disk rotates in the direction of its arrow, is brought first against the hook 85ᵃ and pulls down the pin 79, rocking the frame E upward and forward or in the direction of its arrow, Fig. 12; and after the stud 238 has reached its lower position it passes from the hook 85ᵃ and then makes contact with the shoulder 85 and pushes up the pawl 84 and pin 79, restoring the frame E to its normal position. The frame E is locked in the latter position by a stud 82 upon the link 80 extending over the upper edge of a cam plate 86 secured to the side of the frame, this cam plate being so formed that on the vertical movement of the link 80 the contact of the lug 82 with the rear edge of the said plate will properly guide the link 80 as it swings down and carry it outward as it swings upward, a spring 87 tending to carry the two links toward each other. The forward edge of the cam plate 86 is so formed as to impart proper swinging movement to the link 84 a stud 83 upon which bears upon said forward edge. The rotation of the shaft 41 is also made the means of imparting the lateral movements to the selector. This is done through the medium of two levers K, P, Figs. 4 and 5, pivoted to a stud 51 upon the base plate and capable of swinging together, when locked by a suitable locking device, or of independent movement.

The lever K is provided with means for engaging a stud 54 Figs. 2, 5, extending downward from a frame Z, Fig. 2, which slides upon parallel rods 53 of the main frame, and which carries laterally with it the selector F, and the lever P has two upright fingers 70, 70 Fig. 5 between which extends a bent or crank portion 38 of the shaft 41. As the motor M is always under tension, tending to rotate the casing and disk 58 in the direction of its arrow, Fig. 12, there of course is always a tendency to turn the shaft 41 in the direction of its arrow and to thereby swing the lever P and also the lever K, when the latter is locked to the lever P. This is the means of effecting the lateral movement of the selector when the numeral keys are depressed, as the depression of each key releases an escapement which permits the lever K and its connections to move one step in the direction of its arrow, Fig. 5. As shown, the escapement consists of two pivoted dogs 12, 13, having lips engaging a curved rack 57 on the end of the lever K, a spring 14 tending to throw the dog 13 into engagement with the rack and a spring 14ª tending to carry the dog 12 out of engagement with the rack. Beneath all the keys extends a rock shaft 63 carrying a yoke 64 which is directly beneath the lower edge of each numeral key lever, and an arm 16 Figs. 5, 7, from the shaft 63 bears against the forward edge of the dog 13, while another arm 15 bears against the forward edge of the dog 12. As a result, when a numeral key is depressed the shaft 63 is rocked, the dog 13 is carried away from the rack 57, and the dog 12 is carried into engagement with a tooth of the said rack, thus holding the lever in place by the dog 12 instead of by the dog 13, and when the key is raised by the action of a suitable spring the dog 12 is carried away from the rack and the dog 13 engages one of the teeth after the lever K has moved a single step, and as the levers P and K are then connected together, the power of the motor, tending to turn the shaft 41, acts through the crank 38 and studs 70 to swing the levers to the extent permitted by the action of the escapement, and this result will ensue whenever a numeral key is depressed.

It will be apparent that so long as the two levers are locked together there can only be a step by step motion, but by unlocking the lever P from the lever K the restraint to the rotation of the shaft 41 is removed, when the disk 58 can be carried round to the termination of its complete rotation, which first carries the lever P away from the lever K and then brings it back, the lock being so formed and being so actuated as to then secure the two levers together.

The locking device, as best shown in Figs. 2, 5 and 6, consists of a slide 142 sliding upon the tail of the lever K and having a projection 145 extending down through a slot in the lever, the said slide being carried in one direction by the spring 143, and the lever P has a hooked end with beveled faces so that when the said end swings toward the lever K and makes contact with the stud 145, it will carry the latter and the slide 142 forward until the stud can enter a notch v in the lever P and lock the latter in place. The slide 142 carries a projection in the shape of a cross-bar 144 so situated in respect to the shaft 31 Figs. 8, 13 that as the latter rotates a longitudinal bar or blade 430 on said shaft will at the proper time contact with the projection 144 and carry the slide 142 forward and release the lever P. The bar 430 on the longitudinal shaft 31 is carried by two sleeves 431 Fig. 13 capable of a slight rotative movement independent of the shaft 31, the sleeves having shoulders bearing on pins 432, extending from the shaft being normally held in contact therewith by a spring 433 coiled around the shaft 31 and secured at one end to a stud on the latter and at the other to one of the sleeves 431. This permits the bar 430 to make contact with the projection 144 and wind up the spring 433 until sufficient power is stored therein to overcome the tension of spring 143 and draw back the slide 142, when the lever P will be released with a quick motion; and further, this arrangement prevents any straining of the parts. It will, of course, be understood that the parts are so arranged that the shaft 31 is turned on the forward movement of the operating handle W so as to wind up the spring of the motor and that the parts will remain at rest until the slide 142 is shifted by the blade 430, unlocking the lever P. As soon as the latter is released the spring can exert its power to rotate the casing of the motor, disk 58, shaft 41, and parts carried therewith, and as the frame E then swings upward, the selector is carried to the left and the frame then swings downward. This is the action even if no keys have been depressed, but if keys have been depressed, then the lever K has been swung to a certain extent in the direction of its arrow (Figs. 4 and 5) and will remain in that position until the lever P swings back and carries it, together with the selector, to its normal position.

*Repeat mechanism.*—In order to repeat or duplicate the printing of any number, it is necessary that the lever K may move back without moving the frame Z and selector to normal position, and to this end the stud 54 on the frame Z extends downward between the edge of the lever K and a hooked catch 315 Fig. 5 which is held so as to engage with the said stud by means of a spring 328. A frame 325 Fig. 8 is suspended to swing from the upper guide rod 53, and from said frame 325 extends an arm 323 Fig. 4 having a pin extending into the slot of a lever 133 of the repeat key; so that by depressing the latter the frame can be swung forward and against a pin 315ª depending from the catch 315 and thereby swing forward the catch 315 to disengage the frame Z from the lever K. In the cross-bar 326 is a series of notches 326ª Fig. 4 and when the bar swings inward one of these notches receives the end of the stud 54 and the frame Z is thereby locked in place against lateral movement so long as the repeater key is depressed, and there may then be repeated printing operations without affecting the operation of the adding mechanism. The repeat key lever 133 is fulcrumed on the rod 61 and is provided with a depending plate 322 Fig. 7 having a slot through which the rock shaft 63 extends, said plate terminating in a finger which extends across the forward edge of the feed pawl 13 whereby when the repeat key is depressed the pawl 13 is rocked to release the lever K. The repeat key lever is also provided with a downwardly extending hook 323 with which coacts a spring 323ª that tends to constantly swing the lower end of said hook rearwardly. Said hook extends through a slot in a plate 60ª secured on the cross-bar 60 on which the feed dogs 12, 13 are mounted, and when the repeat key lever is in substantially horizontal position, the rear end of the hook 323 bears against the forward face of said bar 60. When said repeat key is depressed the end of the hook 323 is carried beneath said bar 60 by the action of the spring 323ª and the parts actuated by said repeat key lever held in their adjusted positions until by the next operation of the machine the number previously recorded has been repeated. The releasing of the hook 323 during the next operation of the machine following the depressing of the repeat key is effected through the rack or toothed segment 324 carried by one arm of the bell crank 324ª, the other arm of which extends into the path of the arm K' Fig. 4 secured to the under side of the lever K and extending inwardly therefrom. At the lower end the hook 323 is provided with a toe 323ᵇ which, when the repeat key is depressed, will enter one of the notches in the segment 324, the particular notch depending upon the distance which the bar K' has moved said segment 324 at the preceding operation of the machine and corresponding to the amount of lateral movement given the selector F by the action of one or more of the numeral keys. As the lever K is moved from its normal position when the machine is operated after the repeat key has been depressed, the bar K' will contact with the bell crank 324ª and rock the same sufficiently to disengage the hook 323 from the bar 60, thus permitting the repeat key lever to rise and restoring the connection between the frame Z and lever K so that the selector will be returned to normal position by the remainder of the movement of the lever K.

*The operating handle.*—The operating handle W (Fig. 17) does not act directly on the shaft 31 but is provided with a toothed sector 440, the teeth of which engage a pinion 441 connected with the outer sleeve 431 on the shaft 31 and having a shoulder adapted to engage a spring dog 442 upon an arm 443 extending from the shaft 31 and so arranged that when the handle is depressed and the pinion 441 rotated in the direction of its arrow (Fig. 17) the shaft 31 is turned to wind up the spring but the reverse action of the handle simply reverses the turning pinion 441 without moving the shaft. To prevent operation of the handle W during the time that a numeral key is being depressed but before the parts controlled and actuated by the depressing of a numeral key have been properly positioned, the rock shaft 63 is provided at one end with a hook 65 which, as said shaft is rocked by the pressure of a key lever on the lug 64, is moved into position to engage a shoulder on a segment W' connected with the operating handle. Normally the hook 65 is in the position shown in Fig. 17, and as soon as the lug 64 is relieved of the pressure caused by depressing a numeral key, said hook is returned to such normal position out of the path of the shoulder. On its inner face the sector 440 is provided with a projecting pin 444, which coöperates with a stop arm 445 pivotally mounted on the side frame of the machine. Said stop arm 445 has at its upper end a notch adapted to receive the pin 444 when the sector has reached its lowest position, as represented in Fig. 17. A cam 446 on the end of the shaft 41 acts to rock said stop arm 445 into the position shown in Fig. 17 against the action of a spring 447. As the shaft 41 turns while the sector 440 is elevated, the cam 446 will move out of engagement with the stop arm 445 and the latter will, through the action of spring 447, be rocked to bring the upper end 448 thereof beneath the pin 444, and thus prevent the sector from moving to its lowest position, while the machine is in motion or until the shaft 41 has turned sufficiently to cause its cam 446 to rock the stop 445 rearwardly. This stop device prevents the pinion 441 from moving sufficiently to cause reengagement of the pawl 442 therewith, while the machine is in motion, and prevents a double winding of the motor spring.

I do not here claim the features shown herein and shown and claimed in my application Serial No. 266,604.

Having thus described the invention what is claimed is,

1. In an adding machine, the combination with a series of adding wheels arranged side by side, a selector having a plurality of rows of movable pins, key actuated means for moving the selector step by step beneath the adder wheels and setting pins therein in position to effect actuation of the adder wheels, a restoring blade mounted to swing over said selector to return the pins thereof to normal position, a correction key, and a link connected with said key and adapted to rock said restorer as the key is depressed, substantially as described.

2. In an adding machine, the combination with a series of adder wheels, a selector having a plurality of rows of movable pins adapted to control the extent of rotation of the adder wheels, numeral keys adapted to adjust any desired ones of said pins to operative position, means to move the selector step by step past the adder wheels, a restorer having a cross blade extending over all of the rows of pins in the selector and mounted to swing about a suitable axis, an arm connected with said restorer, a correction key, and a link extending from said correction key and engaging said arm of the restorer whereby when said key is depressed the cross blade of the restorer will be moved over the selector, substantially as described.

3. In an adding machine, the combination of a series of adding wheels of different numerical orders, a series of type wheels of corresponding numerical orders, a platen arranged adjacent said type wheels, means for transmitting movement of each of the adding wheels to the corresponding type wheel, key controlled devices for turning the adding wheels, and means for bodily moving the type wheels out of engagement with the adding wheels and against the platen at the completion of a movement of the adding wheels.

4. In an adding machine, the combination of a series of adding wheels, a platen, a series of type wheels, a vibrating carrier supporting each type wheel, key controlled devices for rotating the adding wheels, means for transmitting movement from each adding wheel to one of the type wheels, springs acting constantly to move the type wheels toward the platen, and means for preventing such movement of the type wheels while the adding wheels are turning, and adapted to be automatically released when an adding movement of the adding wheels is completed.

5. In an adding machine, the combination of a series of adding wheels, a platen, a series of type wheels, a swinging carrier for each type wheel, key controlled means for rotating the adding wheels, means for transmitting movement of each adding wheel to one of the type wheels, springs each acting to move one of the type wheels toward the platen, locking devices normally preventing such movement of the type wheels, means for releasing the locking means of each type wheel as the corresponding adding wheel is rotated, and means engaging all of the type wheel carriers and adapted to prevent movement of any of said wheels toward the platen while the adding wheels are turning and to be automatically released when the adding movement of the adding wheels is finished.

6. In an adding machine, the combination of a series of adding wheels, a platen, a series of type wheels each mounted in an independently swinging carrier, a toothed sector engaging each type wheel, key controlled means for turning the adding wheels, means for transmitting the movements of each adder wheel to one of said sectors, a spring connected with each type wheel carrier and acting constantly to move said carrier to carry the type wheel against the platen, a latch engaging each carrier to prevent such movement thereof, means actuated by said sector for releasing said latch as the corresponding adding wheel is turned, and means engaging all of said type wheel carriers to prevent swinging movement thereof by said springs while the adding wheels are turning and adapted to be released when the adding movement of such wheels is completed.

7. In an adding machine, the combination of a series of adding wheels, a series of type wheels, key controlled means including a swinging frame for actuating the adding wheels, means for transmitting movement from each wheel to a corresponding printing wheel, a platen common to all of said printing wheels, a ribbon extending between said type wheels and platen, spools supporting said ribbon, a rock shaft, two sleeves rotatably mounted on said shaft and each provided with a ratchet wheel and with a gear adapted to rotate one of the ribbon spools, a pawl carrier mounted on said rock shaft between the ratchets on said sleeves, and means for rocking said shaft adapted to be actuated by said swinging frame of the adding wheel actuating devices.

8. In an adding machine, the combination of a series of adding wheels, a series of type wheels, key controlled means including a swinging frame for actuating the adding wheels, means for transmitting movement from each wheel to a corresponding printing wheel, a platen common to all of said printing wheels, a ribbon extending between said type wheels and platen, spools supporting said ribbon, a rock shaft, two sleeves rotatably mounted on said shaft and each provided with a ratchet wheel and with a gear adapted to rotate one of the ribbon spools, a pawl carrier mounted on said rock shaft between the ratchets on said sleeves, a ratchet connected with the platen, a swinging frame for actuating said ratchet, arms on said rock shaft for actuating said swinging frame, and means for rocking said shaft adapted to be actuated by said swinging frame of the adding wheel actuating devices.

9. In an adding machine, the combination of a series of adding wheels, a series of type carriers, key controlled devices for rotating the adding wheels, including an oscillating frame, means for transmitting movement from each adder wheel to the corresponding printing wheel, a platen, a ribbon extending between the printing wheels and platen, means for effecting a relative movement of the platen and printing wheels to bring the latter against the ribbon and platen, a ratchet connected with the platen, a swinging arm adapted to actuate a pawl engaging said ratchet, means for feeding the ribbon longitudinally, and means for rocking said platen actuating arm and operating the ribbon feeding devices adapted to be actuated by the oscillating frame of the adding wheel actuating means.

10. In an adding machine, the combination with a series of adder wheels, key actuated devices for controlling the extent of movement of said wheels, a motor, a lever, means for rocking said lever from the motor, a second lever, means for locking the two levers together comprising a spring pressed slide mounted on one of the levers and engaging a hook on the other, an escapement controlled by the keys for imparting a step by step movement to said locked levers on successive actions of the keys to properly position parts for operating the adding wheels, and means for moving said slide to disengage said levers after the adjustment of said levers by the keys.

11. In an adding machine, the combination with a series of adding wheels, key actuated means for controlling the rotation of said wheels, a motor, two levers independently mounted to rock about a common axis, means for locking said levers together comprising a slide having a member extending through a slot in one lever and engaging the other lever, an escapement for securing a step by step movement of said locked levers on successive actions of the keys to properly position parts for actuating the adding wheels, and means for disconnecting said levers and winding the spring of the motor after the adjustment of said levers by the keys.

12. In an adding machine, the combination of a series of adding wheels, key actuated devices for controlling the extent of movement of said wheels, a motor, a crank shaft adapted to be rotated by said motor, a lever having lugs extending on opposite sides of a crank on said shaft, a second lever, means detachably connecting said levers, an escapement actuated by the keys for imparting a step by step movement to said levers to position parts for actuating the adding wheels, and means for disconnecting said levers after the adjustment thereof by the keys.

13. In an adding machine, the combination of a series of adding wheels, a spring motor, means actuated by said motor for turning the adding wheels, key actuated devices for determining the extent of movement of the adding wheels by the motor, a crank shaft geared to the motor, a lever engaging said shaft and adapted to be rocked thereby from the motor, a second lever, means for detachably connecting said levers together, an escapement controlled by the keys for causing the motor to impart to said levers a step by step movement to position the parts for determining the extent of movement of the adding wheels, and a handle adapted to wind the motor spring and disconnect said levers after the parts have been properly positioned by the keys.

14. In an adding machine, the combination of a series of adding wheels, a spring motor, means actuated by said motor for turning the adding wheels, key actuated devices for determining the extent of movement of the adding wheels by the motor, a crank shaft geared to the motor, a lever engaging said shaft and adapted to be rocked thereby from the motor, a second lever, means for detachably connecting said levers together, an escapement controlled by the keys for causing the motor to impart to said levers a step by step movement to position the parts for determining the extent of movement of the adding wheels, a shaft extending across said levers and having a member adapted to disengage the levers during each rotation thereof, and a handle adapted to rotate said shaft after the levers have been adjusted by the keys.

15. In an adding machine, the combination of a series of adding wheels, a motor, means for rotating the wheels from the motor, key actuated devices for determining the extent of movement of the adding wheels, a lever, means tending constantly to rock said lever, a second lever, a slide carried by one of said levers and engaging the other, an escapement controlled by the keys for securing a step by step movement of said levers when connected together, a handle, and means actuated by said handle for shifting said slide to disconnect the levers after they have been adjusted by action of the keys.

16. In an adding machine, the combination of a series of adding wheels, a motor, means for actuating the adding wheels from the motor, key actuated devices for determining the extent of movement of the adding wheels, a lever, means tending to constantly move the lever to adjust parts for actuating the adding wheels beneath said wheels, an escapement controlled by the keys for causing a step by step movement of said lever, a swinging indicator plate, means connected with said plate and engaging said lever whereby the plate will be turned step by step in accordance with the movements of the lever, and means for returning said parts to normal position following an actuation of the adding wheels after the operation of the desired keys.

17. In an adding machine, the combination of a series of adding wheels, a motor, means for actuating said wheels from the motor, a selector, a lever connected with said selector, means connected with the motor constantly acting on said selector lever to move it relative to the adding wheels, key actuated means for determining the extent of movement of the adding wheels, an escapement controlled by said keys and causing a step by step movement of said lever and selector, an indicator carried by a rock shaft, and an arm connected with said shaft and extending into the path of said lever, whereby said indicator shaft will be rocked as said lever is moved step by step.

18. In an adding machine, the combination of a series of adding wheels, a motor, means for turning the adding wheels from said motor, a selector, a lever connected with said selector, means connected with the motor and constantly tending to move said lever, key actuated means for determining the extent of movement of the adding wheels, a key controlled escapement for causing a step by step movement of said lever and selector, and a yielding abutment against which said lever rests when in normal position.

19. In an adding machine, the combination of a series of adding wheels, a motor, means connected with the motor for turning the adding wheels, a selector, a lever, means constantly tending to rock said lever, a second lever detachably connected with the first said lever, a selector adapted to be actuated by the last said lever, key actuated means for determining the extent of movement of the adding wheels, a key actuated escapement for causing a step by step movement of said levers, means for disconnecting said levers after they have been positioned by actuation of the keys, an arm projecting from said second lever, and a yielding abutment against which said arm bears when the levers are in normal position.

20. In an adding machine, the combination of a series of adding wheels, a motor, a selector movable transversely of the series of adding wheels, key operated means for adjusting said selector and determining the extent of movement of the adding wheels, means connected with the motor for rocking said lever to position the selector and turn the adding wheels, a key actuated escapement for causing a step by step movement of said lever and selector in one direction, a repeat key adapted to disconnect said lever from the selector and escapement, and means for preventing reëngagement of said lever and selector until a numeral key is depressed.

21. In an adding machine, the combination of a series of adding wheels, a motor, means connected with the motor for turning the adding wheels, a lever, connections between the motor and lever acting to vibrate the latter at each rotation of the motor, a selector detachably connected with said lever, key actuated means for causing a step by step movement of said lever and selector in one direction, means controlled by the keys for determining the extent of movement of the adding wheels, a repeat key adapted to disconnect the lever from the selector prior to returning the latter to normal position, a lock for preventing reëngagement of said selector and lever, and a release device adapted to be actuated by said lever.

22. In an adding machine, the combination of a series of adding wheels, a swinging frame mounted to rock about the axes of the adding wheels, means carried by said frame for rotating the wheels, key actuated devices for determinnig the extent of rotation of the wheels, a rock shaft mounted in the side plates of said swinging frame and having a series of fingers each adapted to engage one of said wheels and turn the same to zero position during a movement of said swinging frame, and a zero key for rocking said shaft.

23. In an adding machine, the combination of a series of adding wheels, a swinging frame mounted to rock about the axes of the adding wheels, means carried by said frame for rotating the wheels, key actuated devices for determining the extent of rotation of the wheels, a rock shaft mounted in the side plates of said swinging frame and having a series of fingers each adapted to engage one of said wheels and turn the same to zero position during a movement of said swinging frame, an arm connected with said shaft, a catch pivoted on said swinging frame and adapted to engage said arm to hold said fingers in position to engage the adding wheels when said shaft is rocked, means for rocking said shaft, and means for automatically releasing said catch as the swinging frame completes its movement in one direction.

24. In an adding machine, the combination of a series of adding wheels, a swinging frame mounted to rock about the axes of the adding wheels, means carried by said frame for rotating the wheels, key actuated devices for determining the extent of rotation of the wheels, a rock shaft mounted in the side plates of said swinging frame and having a series of fingers each adapted to engage one of said wheels and turn the same to zero position during a movement of said swinging frame, a forked arm connected with said shaft, a catch mounted on said swinging frame above the forked arm, a key lever engaging said forked arm and adapted to rock the same into position to be engaged by said catch and thereby turn the shaft to bring its fingers into position to engage the adding wheels, and means for shifting said catch to release the arm and shaft as the swinging frame completes a movement in one direction.

25. In an adding machine, the combination of a series of adding wheels, a swinging frame mounted to rotate about the axes of the adding wheels, a selector carried by said frame and having a plurality of rows of pins each adapted to determine the extent of rotation of one of the adding wheels, numeral keys for adjusting said pins to operative position, means for swinging said frame and thereby turning one or more of the adding wheels in accordance with the previously depressed numeral keys, a swinging bail carried by said frame and adapted to engage all of the adding wheels, a total key adapted to move said bail, to swing it into engagement with the adding wheels, a hook adapted to be rocked by said total key into engagement with a stationary rod to hold said bail in engagement with the adding wheels during movement of the swinging frame in one direction, and means for automatically releasing said hook as the swinging frame returns to normal position.

26. In an adding machine, the combination of a series of adding wheels, a swinging frame mounted to rotate about the axes of the adding wheels, a selector carried by said frame and having a plurality of rows of pins each adapted to determine the extent of rotation of one of the adding wheels, numeral keys for adjusting said pins to operative position, means for swinging said frame and thereby turning one or more of the adding wheels in accordance with the previously depressed numeral keys, a swinging bail carried by said frame and adapted to engage all of the adding wheels, a total key adapted to move said bail to swing it into engagement with the adding wheels, a rock shaft connected with said total key, a hook connected with said shaft and adapted to be rocked thereby into position to engage a stationary rod, and a spring pressed pawl depending from said shaft into the path of a member of said swinging frame and adapted to rock said shaft to release said bail from the adding wheels, as said frame completes its movement in one direction.

27. In an adding machine, the combination of a series of adding wheels arranged side by side, a swinging frame mounted to rock about the axes of the adding wheels, key controlled means for engaging said swinging frame with one or more of the adding wheels and determining the extent of movement of such engaged wheels, means for transmitting movement from one adding wheel to an adjacent wheel as the first said wheel completes a predetermined movement, a bail carried by said frame and adapted to engage all of the adding wheels, a total key, means actuated by said key for moving said bail into engagement with the adding wheels, a rock shaft adapted to be rocked by said total key and having a slot therein to receive a member of each of the carrying devices when so rocked, a catch connected with said shaft to engage a stationary rod when rocked by the total key, and means actuated by the swinging frame for automatically releasing said catch.

In testimony whereof I affix my signature in presence of two witnesses.

ADAM HOCH.

Witnesses:
 HORATIO E. BELLOWS,
 WALTER E. GOODWIN.